(12) United States Patent
Karczewicz et al.

(10) Patent No.: US 11,140,418 B2
(45) Date of Patent: Oct. 5, 2021

(54) BLOCK-BASED ADAPTIVE LOOP FILTER DESIGN AND SIGNALING

(71) Applicant: QUALCOMM Incorporated, San Diego, CA (US)

(72) Inventors: Marta Karczewicz, San Diego, CA (US); Nan Hu, San Diego, CA (US); Vadim Seregin, San Diego, CA (US); Akshay Gadde, Fremont, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 16/511,957

(22) Filed: Jul. 15, 2019

(65) Prior Publication Data

US 2020/0029095 A1  Jan. 23, 2020

Related U.S. Application Data

(60) Provisional application No. 62/699,560, filed on Jul. 17, 2018.

(51) Int. Cl.
| | |
|---|---|
| *H04N 19/70* | (2014.01) |
| *H04N 19/82* | (2014.01) |
| *H04N 19/117* | (2014.01) |
| *H04N 19/186* | (2014.01) |
| *H04N 19/174* | (2014.01) |
| *H04N 19/176* | (2014.01) |
| *H04N 19/13* | (2014.01) |

(52) U.S. Cl.
CPC .......... *H04N 19/70* (2014.11); *H04N 19/117* (2014.11); *H04N 19/13* (2014.11); *H04N 19/174* (2014.11); *H04N 19/176* (2014.11); *H04N 19/186* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 9,667,994 B2 | 5/2017 | Joshi et al. | |
| 9,872,015 B2 | 1/2018 | Fu et al. | |
| 10,116,935 B2* | 10/2018 | Sasai | .................... H04N 19/136 |
| 10,609,417 B2 | 3/2020 | Chao et al. | |
| 2008/0137753 A1 | 6/2008 | He | |

(Continued)

FOREIGN PATENT DOCUMENTS

WO      2007081177 A1      7/2007

OTHER PUBLICATIONS

Alshina E., et al., Known Tools Performance Investigation for Next Generation Video Codin,g, 52nd Meeting, Jun. 19 through 26, 2015, Warsaw, Poland; ITU-Telecommunications Standardization Sector, Study Group 16 Question 6, Video Coding Experts Group (VCEG), VCEG-AZ05_r1, Jun. 25, 2015, 7 pages.

(Continued)

*Primary Examiner* — Tyler W. Sullivan
(74) *Attorney, Agent, or Firm* — Shumaker & Sieffert, P.A.

(57) ABSTRACT

A video decoder can be configured to set each block-level syntax element of a plurality of block-level syntax elements to a value indicating that an adaptive loop filter is enabled for an associated component of the video data in response to determining that a slice-level syntax element is set to a value indicating that values for the plurality of block-level syntax elements are inferred.

32 Claims, 16 Drawing Sheets

(56) References Cited

U.S. PATENT DOCUMENTS

| | | | |
|---|---|---|---|
| 2013/0188733 A1* | 7/2013 | Van der Auwera | H04N 19/124 375/240.24 |
| 2013/0259118 A1* | 10/2013 | Fu | H04N 19/177 375/240.02 |
| 2013/0322518 A1 | 12/2013 | Terada et al. | |
| 2015/0016504 A1* | 1/2015 | Auyeung | H04N 19/33 375/240.02 |
| 2015/0016550 A1* | 1/2015 | Kim | H04N 19/117 375/240.29 |
| 2015/0071356 A1* | 3/2015 | Kim | H04N 19/124 375/240.16 |
| 2015/0271487 A1* | 9/2015 | Li | H04N 19/52 375/240.02 |
| 2015/0304671 A1* | 10/2015 | Deshpande | H04N 19/423 375/240.12 |
| 2015/0341641 A1 | 11/2015 | Kolesnikov et al. | |
| 2017/0054976 A1* | 2/2017 | Li | H04N 19/117 |
| 2017/0180737 A1* | 6/2017 | Ye | H04N 19/159 |
| 2019/0045224 A1* | 2/2019 | Huang | H04N 19/86 |
| 2019/0089961 A1* | 3/2019 | Ahn | H04N 19/593 |
| 2019/0141321 A1* | 5/2019 | Yin | H04N 19/117 |
| 2019/0230350 A1 | 7/2019 | Chen et al. | |
| 2019/0306534 A1* | 10/2019 | Zhang | H04N 19/70 |
| 2019/0373258 A1 | 12/2019 | Karczewicz et al. | |
| 2020/0014925 A1 | 1/2020 | Lim et al. | |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, JCTVC-L1003-v34, 263 pp.

Bross et al., "Versatile Video Coding (Draft 5)," Joint Video Experts Team (JVET) of ITU-T SG 16 WP 3 and ISO/IEC14 UTC 1/5C 291WG 11, 14th Meeting: Geneva, C-H, Mar. 19-27, 2019, JVET-N1001-v8, 400 pp.

Chen J., et al., "Algorithm Description of Joint Exploration Test Model 1," Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Chen J., et al., JVET-G1001-V1 "Algorithm Description of Joint Exploration Test Model 7 (JEM7)," Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Ergen S., "ZigBee/IEEE 802.15.4 Summary," Sep. 10, 2004, 37 pp.

Fu C-M., et al., "Sample Adaptive Offset in the HEVC Standard," IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band," LAN/MAN Standards Committee of the IEEE Computer Society, Dec. 28, 2012, 628 Pages.

International Search Report and Written Opinion—PCT/US2019/041984—ISA/EPO—dated Nov. 5, 2019.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-O0038, 3rd Meeting: Geneva, CH, May 26-Jun. 1, 2016, 4 pages.

Karczewicz M., et al., "Geometry Transformation-based Adaptive In-Loop Filter," Picture Coding Symposium, IEEE, Dec. 4-7, 2016, pp. 1-5, XP033086856, DOI: 10.1109/PCS.2016.7906346, [retrieved on Apr. 19, 2017].

Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://phenix.int-evry.fr/jvet/., No. JVET-B0060, 6 pages.

Norkin A., et al., "HEVC Deblocking Filter," IEEE Transactions on Circuits and Systems for Video Technology, Dec. 1, 2012 (Dec. 1, 2012, vol. 22, No. 12, pp. 1746-1754, XP011487156.

Rudat(Fraunhofer) C., et al., "Inter-Component Context Modelling for Coded Block Flag," 11 JVET Meeting; Jul. 11, 2018-Jul. 18, 2018; Ljubljana; (The Joint Video Exploration Team of ISO/IEC JTC1/SC29/WG11 and ITU-TSG.16), No. JVET-K0281, Jul. 10, 2018 (Jul. 10, 2018), pp. 1-8, XP030199328, Retrieved from the Internet: URL: http://phenix.it-sudparis.eu/jvet/doc_end_user/documents/11_Ljubljana/wg11/JVET-K0281-v6.zip, JVET-K0281-v5.docx , [retrieved on Jul. 10, 2018], p. 5, paragraph 1.2.

Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.

Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Wiegand T., et al., "WD3: Working Draft 3 of High-Efficiency Video Coding," Document JCTVC-E603, 5th Meeting: Geneva, CH, Mar. 16-23, 2011, 293 pages.

* cited by examiner

BLOCK-BASED ADAPTIVE LOOP FILTER DESIGN AND SIGNALING

This application claims the benefit of U.S. Provisional Patent Application 62/699,560, filed Jul. 17, 2018, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in blocks in the same picture. Video blocks in an inter-coded (P or B) slice of a picture may use spatial prediction with respect to reference samples in blocks in the same picture or temporal prediction with respect to reference samples in other reference pictures. Pictures may be referred to as frames, and reference pictures may be referred to as reference frames.

SUMMARY

In general, this disclosure describes techniques for encoding and decoding syntax elements that enable and disable adaptive loop filtering for video data.

According to an example of this disclosure, a method of decoding video data includes receiving, for a first slice of video data, a first instance of a slice-level syntax element; determining whether the first instance of the slice-level syntax element is set to a value indicating that values for a first plurality of block-level syntax elements for a block associated with the first slice are signaled in the video data or is set to a second value indicating that values for the first plurality of block-level syntax elements are inferred; in response to determining that the first instance of the slice-level syntax element is set to the value indicating that values for the first plurality of block-level syntax elements for the block associated with the first slice are signaled in the video data, receiving, for the block of the first slice of video data, the first plurality of block-level syntax elements; determining a value for each block-level syntax element of the first plurality of block-level syntax elements, wherein a first value of a block-level syntax element indicates that an adaptive loop filter is enabled for an associated component of the video data and a second value of the block-level syntax element indicates that the adaptive loop filter is disabled for the associated component; receiving, for a second slice of the video data, a second instance of the slice-level syntax element; determining whether the second instance of the slice-level syntax element is set to a value indicating that values for a second plurality of block-level syntax elements for a block of a second slice are signaled in the video data or a value indicating that values for the second plurality of block-level syntax elements are inferred to be the first value; in response to determining that the second instance of the slice-level syntax element is set to the value indicating that values for the second plurality of block-level syntax elements are inferred, setting each block-level syntax element of the second plurality of block-level syntax elements to the first value; applying the adaptive loop filter to the block of the first slice and the block of the second of slice; and outputting a decoded block of the first slice and a decoded block of the second slice.

According to another example, a device for decoding video data includes a memory configured to store video data and one or more processors implemented in circuitry and configured to receive, for a first slice of video data, a first instance of a slice-level syntax element; determine whether the first instance of the slice-level syntax element is set to a value indicating that values for a first plurality of block-level syntax elements for a block associated with the first slice are signaled in the video data or is set to a second value indicating that values for the first plurality of block-level syntax elements are inferred; in response to determining that the first instance of the slice-level syntax element is set to the value indicating that values for the first plurality of block-level syntax elements for the block associated with the first slice are signaled in the video data, receive, for the block of the first slice of video data, the first plurality of block-level syntax elements; determine a value for each block-level syntax element of the first plurality of block-level syntax elements, wherein a first value of a block-level syntax element indicates that an adaptive loop filter is enabled for an associated component of the video data and a second value of the block-level syntax element indicates that the adaptive loop filter is disabled for the associated component; receive, for a second slice of the video data, a second instance of the slice-level syntax element; determine whether the second instance of the slice-level syntax element is set to a value indicating that values for a second plurality of block-level syntax elements for a block of a second slice are signaled in the video data or a value indicating that values for the second plurality of block-level syntax elements are inferred to be the first value; in response to determining that the second instance of the slice-level syntax element is set to the value indicating that values for the second plurality of block-level syntax elements are inferred, set each block-level syntax element of the second plurality of block-level syntax elements to the first value; apply the adaptive loop filter to the block of the first slice and the block of the second of slice; and output a decoded block of the first slice and a decoded block of the second slice.

According to another example, a computer-readable medium stores instructions that when executed by one or more processor cause the one or more process to receive, for a first slice of video data, a first instance of a slice-level syntax element; determine whether the first instance of the slice-level syntax element is set to a value indicating that values for a first plurality of block-level syntax elements for a block associated with the first slice are signaled in the video data or is set to a second value indicating that values for the first plurality of block-level syntax elements are inferred; in response to determining that the first instance of the slice-level syntax element is set to the value indicating that values for the first plurality of block-level syntax elements for the block associated with the first slice are signaled in the video data, receive, for the block of the first slice of video data, the first plurality of block-level syntax elements; determine a value for each block-level syntax element of the first plurality of block-level syntax elements, wherein a first value of a block-level syntax element indicates that an adaptive loop filter is enabled for an associated component of the video data and a second value of the block-level syntax element indicates that the adaptive loop filter is disabled for the associated component; receive, for a second slice of the video data, a second instance of the slice-level syntax element; determine whether the second instance of the slice-level syntax element is set to a value indicating that values for a second plurality of block-level syntax elements for a block of a second slice are signaled in the video data or a value indicating that values for the second plurality of block-level syntax elements are inferred to be the first value; in response to determining that the second instance of the slice-level syntax element is set to the value indicating that values for the second plurality of block-level syntax elements are inferred, set each block-level syntax element of the second plurality of block-level syntax elements to the first value; apply the adaptive loop filter to the block of the first slice and the block of the second of slice; and output a decoded block of the first slice and a decoded block of the second slice.

According to another example, a device for encoding video data includes a memory configured to store video data and one or more processors implemented in circuitry and configured to determine whether all blocks of a first slice of video data have an adaptive loop filter enabled for all associated components of the first slice; in response to determining that all blocks of the first slice of video data have the adaptive loop filter enabled for all associated components of the first slice, set a first instance of a slice-level syntax element to a value indicating that values for a first plurality of block-level syntax elements for a first block of the first slice of video data are inferred; determine whether all blocks of a second slice of video data have the adaptive loop filter enabled for all associated components of the second slice; in response to determining that not all blocks of the second slice of video data have the adaptive loop filter enabled for all associated components of the second slice, set a second instance of the slice-level syntax element to a value indicating that values for a second plurality of block-level syntax elements for a second block of the second slice of video data are signaled in the video data; determine, for each respective component of a second block of the second slice, whether the adaptive loop filter is enabled or disabled for the respective component of the second block; based on determining whether the adaptive loop filter is enabled or disabled for the respective component of the second block, set, for each respective component, a syntax element of a second plurality of syntax elements to either a first value indicating that the adaptive loop filter is enabled or a second value indicating that the adaptive loop filter is disabled; and output an encoded bitstream of video data comprising the first instance of the slice-level syntax element, the second instance of the slice-level syntax element, and the second plurality of block-level syntax elements.

The details of one or more examples are set forth in the accompanying drawings and the description below. Other features, objects, and advantages will be apparent from the description, drawings, and claims.

DETAILED DESCRIPTION

Figure 1:
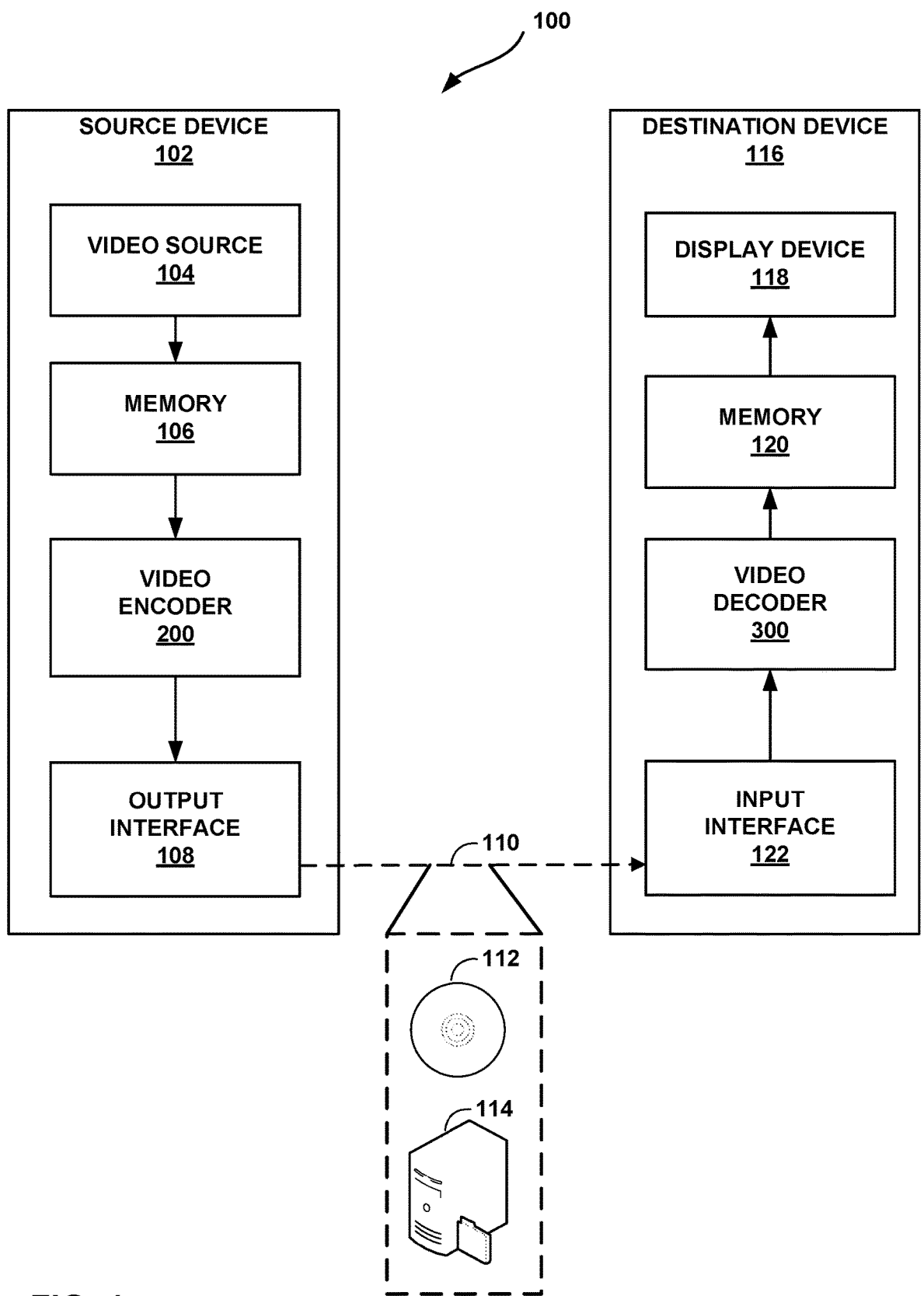
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (i.e. intra prediction) or an already coded block of video data in a different picture (i.e. inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks. Examples of these filtering operations include deblock filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques associated with filtering reconstructed video data in a video encoding and/or video decoding process and, more particularly, this disclosure describes techniques related to ALF and signaling whether ALF is enabled or disabled for blocks of video data. The described techniques, however, may also be applied to other filtering schemes, such as other types of loop filtering, that require explicitly signaling of filter parameters.

In accordance with this disclosure, filtering is applied at an encoder, and filter information is encoded in the bitstream to enable a decoder to identify the filtering that was applied at the encoder. The video encoder may test several different filtering scenarios, and based on, for example, a rate-distortion analysis, choose a filter or set of filters that produces a desired tradeoff between reconstructed video quality and compression quality. The video decoder either receives encoded video data that includes the filter information or implicitly derives the filter information, decodes the video data, and applies filtering based on the filtering information. In this way, the video decoder applies the same filtering that was applied at the video encoder.

This disclosure describes techniques related to ALF and, more specifically, to techniques for block-based ALF signaling. The techniques described herein may be used with advanced video codecs, such as extensions of HEVC or the next generation of video coding standards such as versatile video coding (VVC). As described in more detail below, by setting a value for each block-level syntax element of a plurality of block-level syntax elements to a value indicating that an adaptive loop filter is enabled for an associated component of video data and in response to determining that a slice-level syntax element is set to a value indicating that values for a plurality of block-level syntax elements for a block are inferred to be equal to a value, the techniques of this disclosure may reduce the signaling overhead associated with ALF, which in turn may improve overall coding efficiency, thus improving the video encoding and video decoding functionality of video coding devices.

FIG. 1 is a block diagram illustrating an example video encoding and decoding system 100 that may perform the ALF signaling techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling ALF information. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for signaling ALF information. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coding structures (e.g., slices, pictures, groups of pictures, sequences, or the like). HEVC defines a slice as an integer number of coding tree units contained in one independent slice segment and all subsequent dependent slice segments (if any) that precede the next independent slice segment (if any) within the same access unit.

Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device.

A device including video encoder 200 and/or video decoder 300 may include an integrated circuit, a microprocessor, and/or a wireless communication device, such as a cellular telephone.

Video encoder 200 and video decoder 300 may operate according to a video coding standard. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. Additionally, a new video coding standard, namely High Efficiency Video Coding (HEVC) or ITU-T H.265, including its range extension, multi-view extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The latest version of reference software, i.e., Joint Exploration Model 7 (JEM 7) can be downloaded from: https://jvet.hhi-.fraunhofer.de/svn/svn_HMJEMSoftware/tags/HM-16.6-JEM-37.0/ An algorithm description of Joint Exploration Test Model 7 (JEM7) is described in JVET-G1001. Video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, WET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to CUs.

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value.

The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
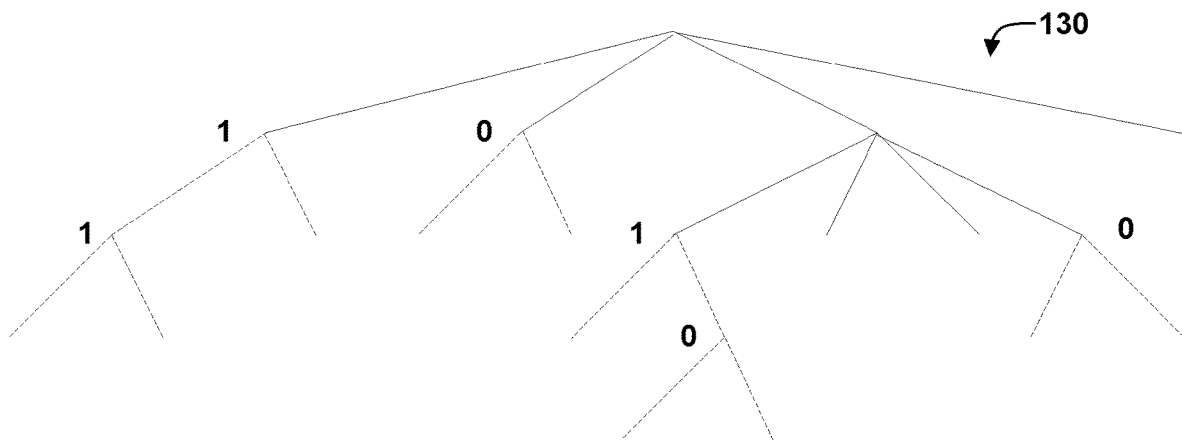
FIGS. 2A and 2B are conceptual diagrams illustrating an example quadtree binary tree (QTBT) structure, and a corresponding coding tree unit (CTU).
Figure 2B:
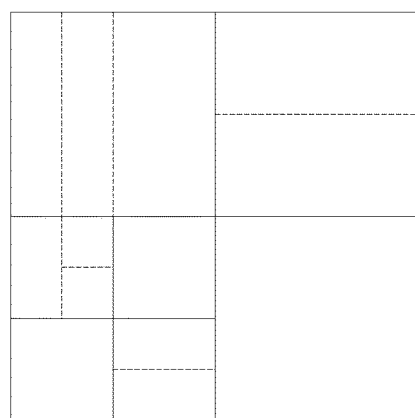

FIGS. 2A and 2B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a CU, which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node is not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Figure 3:
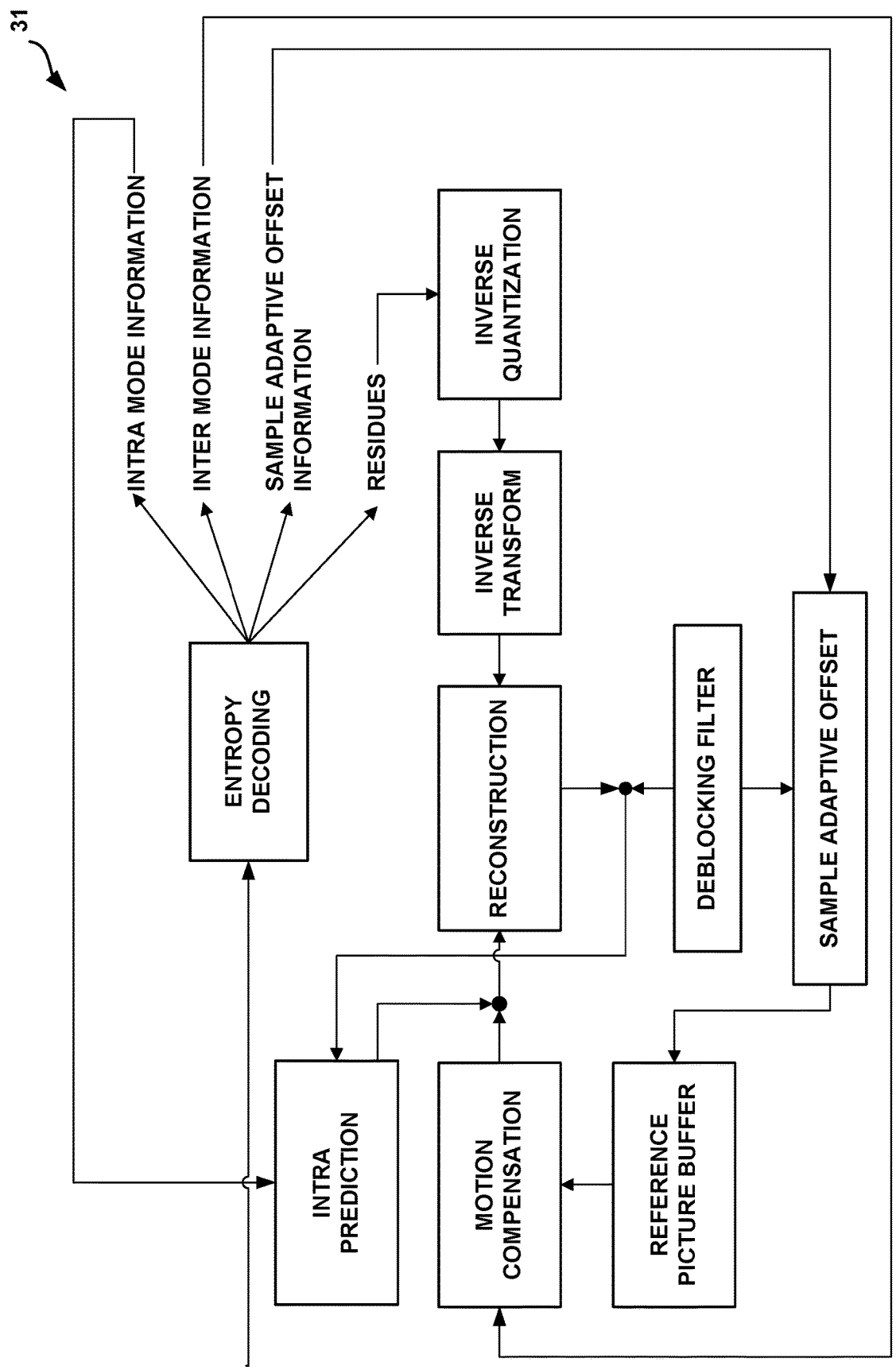
FIG. 3 is a block diagram of an example High Efficiency Video Coding (HEVC) decoder.

Aspects of HEVC and JEM techniques will now be discussed. FIG. 3 is a block diagram HEVC decoder 31. Video decoder 31 shown in FIG. 3 generally corresponds to video decoder 300 but represents an alternative illustration. HEVC and video decoder 31 employ two in-loop filters, namely a de-blocking filter (DBF) and a sample adaptive offset (SAO) filter. The input to the DBF is the reconstructed image after intra or inter prediction. The DBF performs detection of the artifacts at the coded block boundaries and attenuates them by applying a selected filter. Compared to the H.264/AVC deblocking filter, the HEVC deblocking filter has lower computational complexity and better parallel processing capabilities while still achieving significant reduction of the visual artifacts, as described in more detail in M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-B0060, $2^{nd}$ Meeting: San Diego, USA, 20 Feb.-26 Feb. 2016.

The input to the SAO filter is the reconstructed image after applying the deblocking filter. The operating principle of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a CTU.

Two SAO types that can satisfy the requirements of low complexity are adopted in HEVC and implemented in video decoder 31. Those two SAO types are referred to as edge offset (EO) SAO and band offset (BO) SAO. An index of an SAO type is coded (which is in the range of [0, 2]). In the context of signaling an SAO type, not performing SAO or skipping SAO may be considered a third type of SAO. For EO, the sample classification is based on comparison between current samples and neighboring samples according to 1-D directional patterns: horizontal, vertical, 135° diagonal, and 45° diagonal.

Figure 4A:
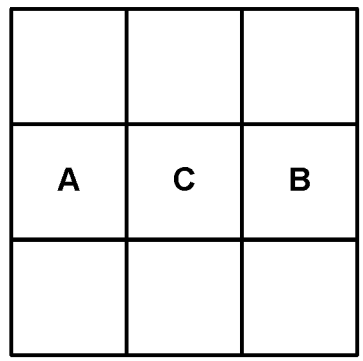
FIGS. 4A-4D show four 1-D directional patterns for edge offset (EO) sample classification.
Figure 4B:
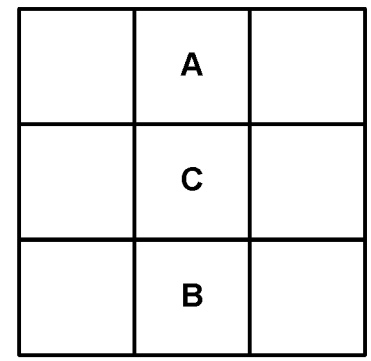
Figure 4C:
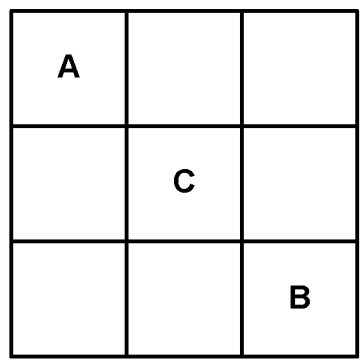
Figure 4D:
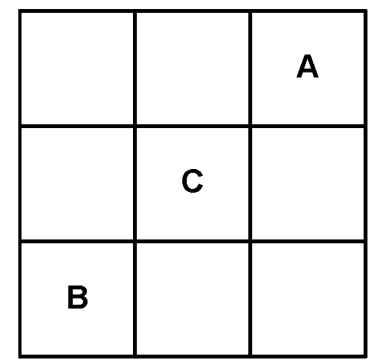

FIGS. 4A-4D show four 1-D directional patterns for EO sample classification: horizontal (FIG. 4A, EO class=0), vertical (FIG. 4B, EO class=1), 135° diagonal (FIG. 4C, EO class=2), and 45° diagonal (FIG. 4D, EO class=3). Additional details related to SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012).

According to the selected EO pattern, five categories denoted by edgeIdx in Table I are further defined. For edgeIdx equal to 0~3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case.

TABLE I classification for EO

| Category (edgeIdx) | Condition |
|---|---|
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | None of the above |

For BO, the sample classification is based on sample values. Each color component may have its own SAO parameters for classification for BO type SAO filtering. BO implies one offset is added to all samples of the same band. The sample value range is equally divided into 32 bands. For 8-bit samples ranging from 0 to 255, the width of a band is 8, and sample values from 8k to 8k+7 belong to band k, where k ranges from 0 to 31. The average difference between the original samples and reconstructed samples in a band (i.e., offset of a band) is signaled to the decoder (e.g., video decoder 30). There is no constraint on offset signs. Only offsets of four consecutive bands and the starting band position are signaled to the decoder (e.g., video decoder 30). For both EO and BO, each color component may have its own SAO parameters.

During the development of HEVC, other types of filtering, including ALF, were considered in order to enhance the quality of a decoded video signal. ALF was proposed in HEVC and was included in various working drafts and test model software, i.e., the HEVC Test Model (or "HM"), although ALF was not included in the final version of HEVC. Among the related technologies, the ALF design in the HEVC test model version HM-3.0 was claimed as the most efficient design. (See T. Wiegand, B. Bross, W. J. Han, J. R. Ohm and G. J. Sullivan, "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, 16-23 March, 2011, hereinafter "Working Draft 3", the entire contents of which are incorporated herein by reference). Therefore, the ALF design from HM-3.0 is introduced herein.

The version of ALF included in HM-3.0 is based on picture level optimization. That is, the ALF coefficients are derived after a whole frame is coded. There were two modes for the luma component, referred to as block-based adaptation (BA) and region based adaptation (RA). These two modes share the same filter shapes, filtering operations, as well as the same syntax elements. One difference between BA and RA is the classification method, where classification generally refers to classifying a pixel or block of pixels so as to determine which filter from a set of filters to apply to the pixel or block of pixels.

In one example approach, the classification in BA is at a block level. For the luma component, 4×4 blocks in the whole picture are classified based on one-dimensional (1D) Laplacian direction (e.g., up to 3 directions) and two-dimensional (2D) Laplacian activity (e.g., up to 5 activity values). In one example approach, each 4×4 block in a picture is assigned a group index based on one-dimensional (1D) Laplacian direction and two-dimensional (2D) Laplacian activity. One example calculation of direction $Dir_b$ and unquantized activity $Act_b$ is shown in equations (1)-(4) below, where $\hat{I}_i$ indicates a reconstructed pixel with relative coordinate (i,j) to the top-left pixel position of a 4×4 block, $V_{i,j}$ and $H_{i,j}$ are the absolute values of vertical and horizontal gradient of the pixel located at (i,j). As such, direction $Dir_b$ is generated by comparing the absolute values of the vertical gradient and the horizontal gradient in the 4×4 block and $Act_b$ is the sum of the gradients in both directions in the 4×4 block. $Act_b$ is further quantized to the range of 0 to 4, inclusive, as described in the "WD3: Working Draft 3 of High-Efficiency Video Coding" document discussed above.

$$V_{i,j} = |\hat{I}_{i,j} \times 2 - \hat{I}_{i,j-1} - \hat{I}_{i,j+1}| \qquad (1)$$

$$H_{i,j} = |\hat{I}_{i,j} \times 2 - \hat{I}_{i-1,j} - \hat{I}_{i+1,j}| \qquad (2)$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} H_{i,j}\right) \\ 0, & \text{otherwise} \end{cases} \qquad (3)$$

$$Act_b = \sum_{i=0}^{3}\sum_{j=0}^{3}\left(\sum_{m=i-1}^{i+1}\sum_{n=j-1}^{j+1}(V_{m,n} + H_{m,n})\right) \qquad (4)$$

In one example approach, therefore, each block can be categorized into one out of fifteen (5×3) groups (i.e., classes as follows). An index is assigned to each 4×4 block according to the value of $Dir_b$ and $Act_b$ of the block. Denote the group index by C and set C equal to $5Dir_b + \hat{A}$ where $\hat{A}$ is the quantized value of $Act_b$. Therefore, up to fifteen sets of ALF parameters could be signaled for the luma component of a picture. To save the signaling cost, the groups may be merged along group index value. For each merged group, a set of ALF coefficients is signaled.

Figure 5:
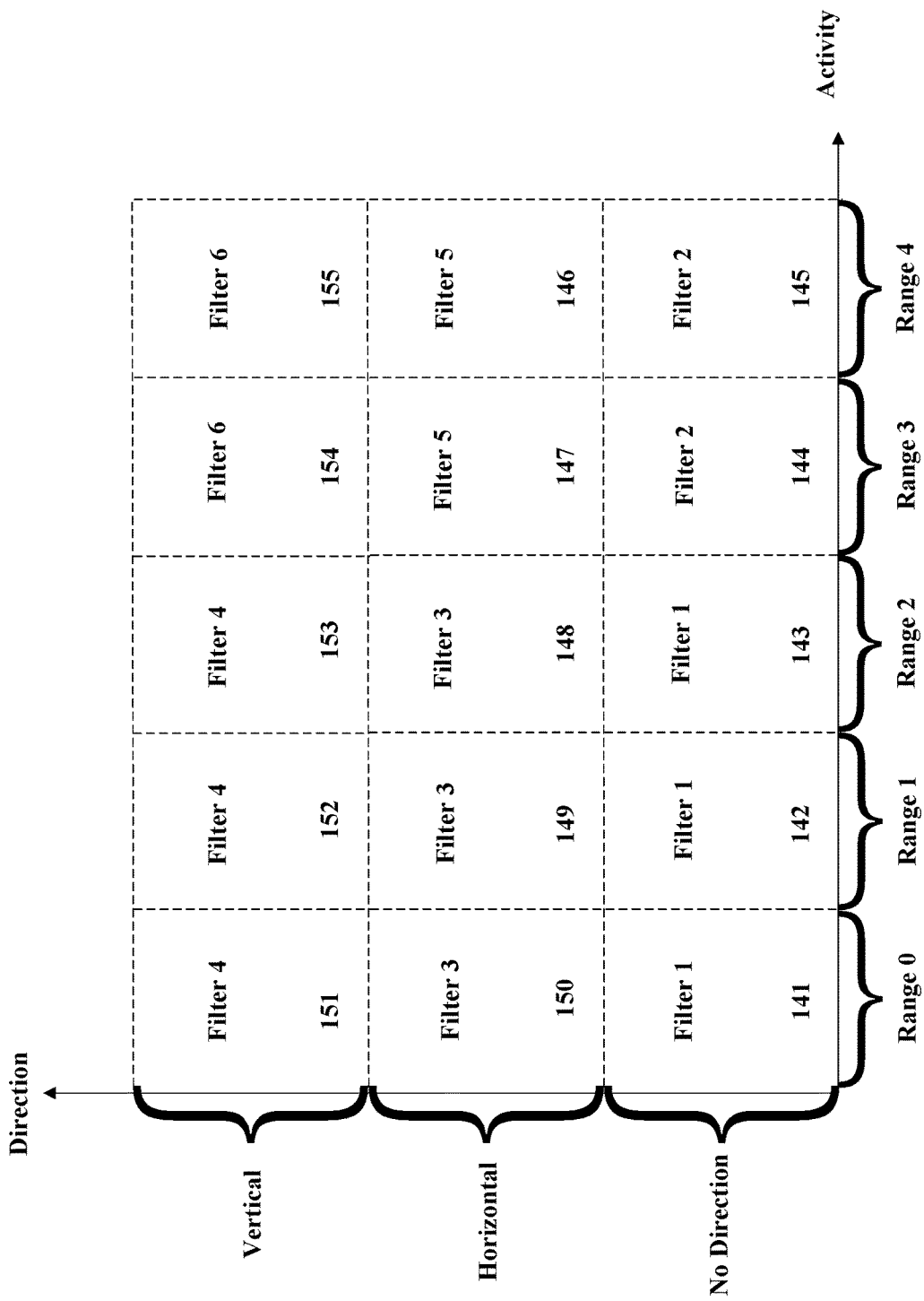
FIG. 5 is a conceptual diagram illustrating classifications for adaptive loop filtering.

FIG. 5 is a conceptual diagram illustrating these 15 groups (also referred to as classes) used for BA classification. In the example of FIG. 5, filters are mapped to ranges of values for an activity metric (i.e., Range 0 to Range 4) and a direction metric. The direction metric in FIG. 5 is shown as having values of No Direction, Horizontal, and Vertical, which may correspond to the values of 0, 1, and 2 above from equation 4. The particular example of FIG. 5 shows six different filters (i.e. Filter 1, Filter 2 . . . Filter 6) as being mapped to the 15 categories, but more or fewer filters may similarly be used. Although FIG. 5 shows an example, with 15 groups, identified as groups 141 through 155, more or fewer groups may also be used. For example, instead of five ranges for the activity metric more or fewer ranges may be used resulting in more groups. Additionally, instead of only three directions, additional or alternative directions (e.g. a 45-degree direction and 135-degree direction) may also be used.

The filters associated with each group of blocks can be signaled using one or more merge flags. For one-dimensional group merging, a single flag may be sent to indicate if a group is mapped to the same filter as a previous group. For two-dimensional merging, a first flag may be sent to indicate if a group is mapped to the same filter as a first neighboring block (e.g. one of a horizontal or vertical neighbor), and if that flag is false, a second flag may be sent to indicate if the group is mapped to a second neighboring block (e.g. the other of the horizontal neighbor or the vertical neighbor).

Classes may be grouped into what are called merged groups, where each class in the merged group maps to the same filter. Referring to FIG. 5 as an example, groups 141, 142, and 143 may be grouped into a first merged group; groups 144 and 145 may be grouped into a second merged group, and so on. Typically, not all classes mapped to a certain filter need to be in the same merged group, but all classes in the merged group need to be mapped to the same filter. In other words, two merged groups may map to the same filter.

Filter coefficients may be defined or selected in order to promote desirable levels of video block filtering that can reduce blockiness and/or otherwise improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

In this disclosure, the term "filter" with respect to ALF generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×7 is an example of a second shape, and 5×5 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration.

In addition to the modified DB and HEVC SAO methods, JEM includes another filtering method, called Geometry transformation-based Adaptive Loop Filtering (GALF), which builds upon the techniques of the ALF filter included in HM-3. Aspects of ALF and GALF are described in more detail in Tsai, C. Y., Chen, C. Y., Yamakage, T., Chong, I. S., Huang, Y. W., Fu, C. M., Itoh, T., Watanabe, T., Chujoh, T., Karczewicz, M. and Lei, S. M., "Adaptive loop filtering for video coding", *IEEE Journal of Selected Topics in Signal Processing*, 7(6), pp. 934-945, 2013 and M. Karczewicz, L. Zhang, W.-J. Chien, and X. Li, "Geometry transformation-based adaptive in-loop filter", Picture Coding Symposium (PCS), 2016.

The input to ALF/GALF is the reconstructed image after the application of SAO. ALF tries to minimize the mean square error between original samples and decoded samples by using an adaptive Wiener filter. The input image can be denoted as p, the source image as S, and the FIR filter as h. Then the following expression of SSE can be minimized, with (x, y) denoting any pixel position in p or S.

$$SSE = \Sigma_{x,y}(\Sigma_{i,j}h(i,j)p(x-i,y-j)-S(x,y))^2$$

The optimal h, denoted as $h_{opt}$, can be obtained by setting the partial derivative of SSE with respect to h(i, j) equal to 0 as follows:

$$\frac{\partial SSE}{\partial h(i, j)} = 0$$

This leads to the Wiener-Hopf equation shown below, which gives the optimal filter $h_{opt}$:

$$\Sigma_{i,j}h_{opt}(i,j)(\Sigma_{x,y}P(x-i,y-j)p(x-m,y-n)) = \Sigma_{x,y}S(x,y)p(x-m,y-n)$$

In JEM, instead of using one filter for the whole picture, samples in a picture are classified into 25 classes based on the local gradients. Referring back to FIG. 5, ALF as contemplated in JEM includes two additional directions (45-degree and 135-degree) not shown in FIG. 5. Separate optimal Wiener filters are derived for the pixels in each class.

Several techniques have been employed to increase the effectiveness of ALF by reducing signaling overhead and computational complexity. One example of such a technique is prediction from fixed filters, where optimal filter coefficients for each class can be predicted using a prediction pool of fixed filters which consists of 16 candidate filters for each class. The best prediction candidate is selected for each class and only the prediction errors are transmitted.

Another such example is class merging, where instead of using 25 different filters (one for each class), pixels in multiple classes can share one filter in order to reduce the number of filter parameters to be coded. Merging two classes can lead to higher cumulative SSE but lower RD cost.

Another such example is using a variable number of taps, where the number of filter taps is adaptive at the frame level. Theoretically, filters with more taps can achieve lower SSE, but may not be a good choice in terms of Rate-Distortion (R-D) cost, because of the bit overhead associated with more filter coefficients.

Another such technique is block level on/off control, where ALF can be turned on and off on a block basis. The block size at which the on/off control flag is signaled is adaptively selected at the frame level. Filter coefficients may be recomputed using pixels from only those blocks for which is ALF is on.

Another such techniques is temporal prediction, where filters derived for previously coded frames can be stored in a buffer. If the current frame is a P or B frame, then one of the stored set of filters may be used to filter this frame if it leads to better RD cost. A flag is signaled to indicate usage of temporal prediction. If temporal prediction is used, then an index indicating which set of stored filters is used is signaled. No additional signaling of ALF coefficients is needed. Block level ALF on/off control flags may be also signaled for a frame using temporal prediction.

Aspects of ALF, including pixel classification and geometry transformation will now be discussed. Sums of absolute values of vertical, horizontal and diagonal Laplacians at all pixels within a 6×6 window that covers each pixel in a reconstructed frame (before ALF) are computed. The reconstructed frame is then divided into non-overlapped 2×2 blocks. The four pixels in these blocks are classified into one of 25 categories, denoted as $C_k$ (k=0, 1, . . . , 24), based on the total Laplacian activity and directionality of that block. Additionally, one of four geometry transformations (no transformation, diagonal flip, vertical flip or rotation) is also applied to the filters based on the gradient directionality of that block. The details can be found in more detail in M. Karczewicz, L. Zhang, W.-J. Chien, and X. Li, "Geometry transformation-based adaptive in-loop filter", Picture Coding Symposium (PCS), 2016.

Filter derivation and prediction from fixed filters in ALF will now be discussed. For each class $C_k$, best prediction filter is first selected from the pool for $C_k$, denoted as $h_{pred,k}$, based on the SSE given by the filters. The SSE of $C_k$, which we want to minimize, can be written as below, $$SSE_k = \Sigma_{x,y}(\Sigma_{i,j}(h_{pred,k}(i,j)+h_{\Delta,k}(i,j))p(x-i,y-j)-S(x,y))^2,$$
$$k=0, \ldots, 24, (x,y) \in C_k,$$

where $h_{\Delta,k}$ is the difference between the optimal filter for $C_k$ and $h_{pred,k}$. Let $p'(x,y)=\Sigma_{i,j} h_{pred,k}(i,j)p(x-i, y-j)$ be the result of filtering pixel $p(x, y)$ by $h_{pred,k}$. Then the expression for $SSE_k$ can be re-written as $$SSE_k = \Sigma_{x,y}(\Sigma_{i,j} h_{\Delta,k}(i,j)p(x-i,y-j)-(S(x,y)-p'(x,y)))^2$$
$$k=0, \ldots, 24, (x,y) \in C_k$$

By making the partial derivative of $SSE_k$ with respect to $h_{\Delta,k}$ (i, j) equal to 0, the modified Wiener-Hopf equation is obtained as follows:

$$\Sigma_{i,j} h_{\Delta,k}(i,j)(\Sigma_{x,y} p(x-i,y-j)p(x-m,y-n)) = \Sigma_{x,y}(S(x,y)-p'(x,y))p(x-m,y-n)$$

$$k=0, \ldots, 24, (x,y) \in C_k$$

For the simplicity of expression, denote $\Sigma_{x,y} p(x-i, y-j) p(x-m, y-n)$ and $\Sigma_{x,y}(S(x, y)-p'(x, y))p (x-m, y-n)$ with $(x, y) \in C_k$ by $R_{pp,k}(i-m,j-n)$ and $R'_{ps,k}(m, n)$, respectively. Then, the above equation can be written as:

$$\Sigma_{i,j} h_{\Delta,k}(i,j) R_{pp,k}(i-m,j-n) = R'_{ps,k}(m,n) \ k=0, \ldots, 24 \quad (1)$$

Note that for every $C_k$, the auto-correlation matrix $R_{pp,k}$ (i-m,j-n) and cross-correlation vector $R'_{ps,k}(m, n)$ can be computed over all $(x, y) \in C_k$.

In the current ALF, only the difference between the optimal filter and the fixed prediction filter is calculated and transmitted. Note that if none of the candidate filters available in the pool is a good predictor, then the identity filter (i.e., the filter with only one non-zero coefficient equal to 1 at the center that makes the input and output identical) will be used as the predictor.

Merging of pixel classes will now be discussed. As mentioned before, classes are merged to reduce the overhead of signaling filter coefficients. The cost of merging two classes is increase in SSE. Consider two classes $C_m$ and $C_n$ with SSEs given by $SSE_m$ and $SSE_n$, respectively. Let $C_{m+n}$ denote the class obtained by merging $C_m$ and $C_n$ with SSE, denoted as $SSE_{m+n}$. $SSE_{m+n}$ is always greater than or equal to $SSE_m + SSE_n$. Let $\Delta SSE_{m+n}$ denote the increase in SSE caused by merging $C_m$ and $C_n$, which is equal to $SSE_{m+n} - (SSE_m + SSE_n)$. To calculate $SSE_{m+n}$, one needs to derive $h_{\Delta,m+n}$, the filter prediction error for $C_{m+n}$, using the following expression similar to (1):

$$\Sigma_{i,j} h_{\Delta,m+n}(i,j)(R_{pp,m}(i-u,j-v)+R_{pp,n}(i-u,j-v)) = R'_{ps,m}(u,v)+R'_{ps,n}(u,v) \quad (2)$$

The SSE for the merged category $C_{m+n}$ can then be calculated as:

$$SSE_{m+n} = -\Sigma_{u,v} h_{\Delta,m+n}(u,v)(R'_{ps,m}(u,v)+R'_{ps,n}(u,v)) + (R_{ss,m}+R_{ss,n})$$

To reduce the number of classes from N to N−1, one needs to find two classes $C_m$ and $C_n$, such that merging them leads to the smallest $\Delta SSE_{m+n}$ compared to any other combinations. The current ALF checks every pair of available classes for merging to find the pair with the smallest merge cost.

If $C_m$ and $C_n$ (with m<n) are merged, then $C_n$ is marked unavailable for further merging and the auto- and cross-correlations for $C_m$ are changed to the combined auto- and cross-correlations as follows:

$$R_{pp,m} = R_{pp,m} + R_{pp,n}$$

$$R'_{ps,m} = R'_{ps,m} + R'_{ps,n}$$

$$R_{ss,m} = R_{ss,m} + R_{ss,n}$$

Optimal number of ALF classes after merging needs to be decided for each frame based on the RD cost. This is done by starting with 25 classes and merging a pair of classes (from the set of available classes) successively until there is only one class left. For each possible number of classes (1, 2, . . . , 25) left after merging, a map indicating which classes are merged together is stored. The optimal number of classes is then selected such that the RD cost is minimized as follows:

$$N_{opt} = \underset{N}{\operatorname{argmin}}(J|_N = D|_N + \lambda R|_N),$$

where $D|_N$ is the total SSE of using N classes ($D|_N = \Sigma_{k=0}^{N-1} SSE_k$), $R|_N$ is the total number of bits used to code the N filters, and $\lambda$ is the weighting factor determined by the quantization parameter (QP). The merge map for $N_{opt}$ number of classes, indicating which classes are merged together, is transmitted.

Aspects of signaling of ALF Parameters will now be described. A brief example step by step description of an ALF parameter encoding process is given below. If implementing this example process, video encoder 200 may signal the frame level ALF on/off flag, and if ALF is on, then signal the temporal prediction flag. If temporal prediction is used, then video encoder 200 signals the index of the frame whose ALF parameters are used for filtering the current frame. If temporal prediction is not used, then video encoder 200 signals the auxiliary ALF information and filter coefficients as follows. Video encoder 200 signals the following auxiliary ALF information before signaling the filter coefficients—(1) the number of unique filters used after class merging, (2) the umber of filter taps, (3) class merge information indicating which classes share the filter prediction errors, and (4) index of the fixed filter predictor for each class. After signaling the auxiliary information, video encoder 200 signals the filter coefficient prediction errors by signalling a flag indicating if the filter prediction errors are forced to 0 for some of the remaining classes after merging, a flag indicating if differential coding is used for signaling filter prediction errors (if the number of classes left after merging is larger than 1), and filter coefficient prediction errors using k-th order Exp-Golomb code, where the k-value for different coefficient positions is selected empirically, and directly coding filter coefficients for chroma components, if available, without any prediction methods. Finally, video encoder 200 signals the block level ALF on/off control flags.

A block-based ALF was proposed in U.S. patent application Ser. No. 16/427,017, filed 30 May 2019. In the proposed block-based ALF, for each component of a block, a flag is signaled to specify whether the corresponding reconstructed pixels are filtered. Existing techniques have some potential problems. As one example, existing techniques for how to signal the flag specifying whether ALF is applied to a chroma component block does not consider the collocated luma component. I n addition, there are no slice level flags to control luma, chroma(cb/cr) ALF blocks on/off. For example, when ALF is applied to all CTUs, one slice-level flag can be signaled such that no CTU level flag is signaled.

This disclosure introduces techniques that may further improve the coding gains and visual quality obtained by ALF by addressing the shortcomings described above. The following techniques may be applied individually, or any combination of them may be applied.

According to one technique of this disclosure, the value of the syntax element alf_blk_enable_flag[i][j] can determine whether ALF is applied to jth component of ith coding block, where j=0 is luma, j=1 is cb and j=2 is cr.

According to one example, video encoding 200 may signal and video decoder 300 may receive the syntax elements for one chroma block, alf_blk_enable_flag[i][1] and alf_blk_enable_flag[i][2] based on the alf_blk_enable_flag[i][0]. For example, video encoder 200 and video decoder 300 can determine the context for alf_blk_enable_flag[i][1] and alf_blk_enable_flag[i][2] based on alf_blk_enable_flag[i][0]. For example, video encoder 200 and video decoder 300 may use context 0 when alf_blk_enable_flag[i][0] is 0 and context 1 when alf_blk_enable_flag[i][0] is 1. In another example, when signaling alf_blk_enable_flag[i][1], video encoder 200 and video decoder 300 may use context 0 when alf_blk_enable_flag[i][0] is 0 and use context 1 when alf_blk_enable_flag[i][0] is 1. When signaling alf_blk_enable_flag[i][2], video encoder 200 and video decoder 300 may use context 2 when alf_blk_enable_flag[i][0] is 0 and use context 3 when alf_blk_enable_flag[i][0] is 1.

According to one example, video encoder 200 may transmit and video decoder 300 may receive a slice-level flag alf_blk_present_flag[k], k=0, 1 and 2, and when when alf_blk_present_flag[k] is equal 1, video decoder 300 may infer that all alf_blk_enable_flag[i][k] are equal to 1. When alf_blk_present_flag[k] is equal 0, video decoder 300 may receive, in a video bitstream, values for all alf_blk_enable_flag[i][k].

Figure 6:
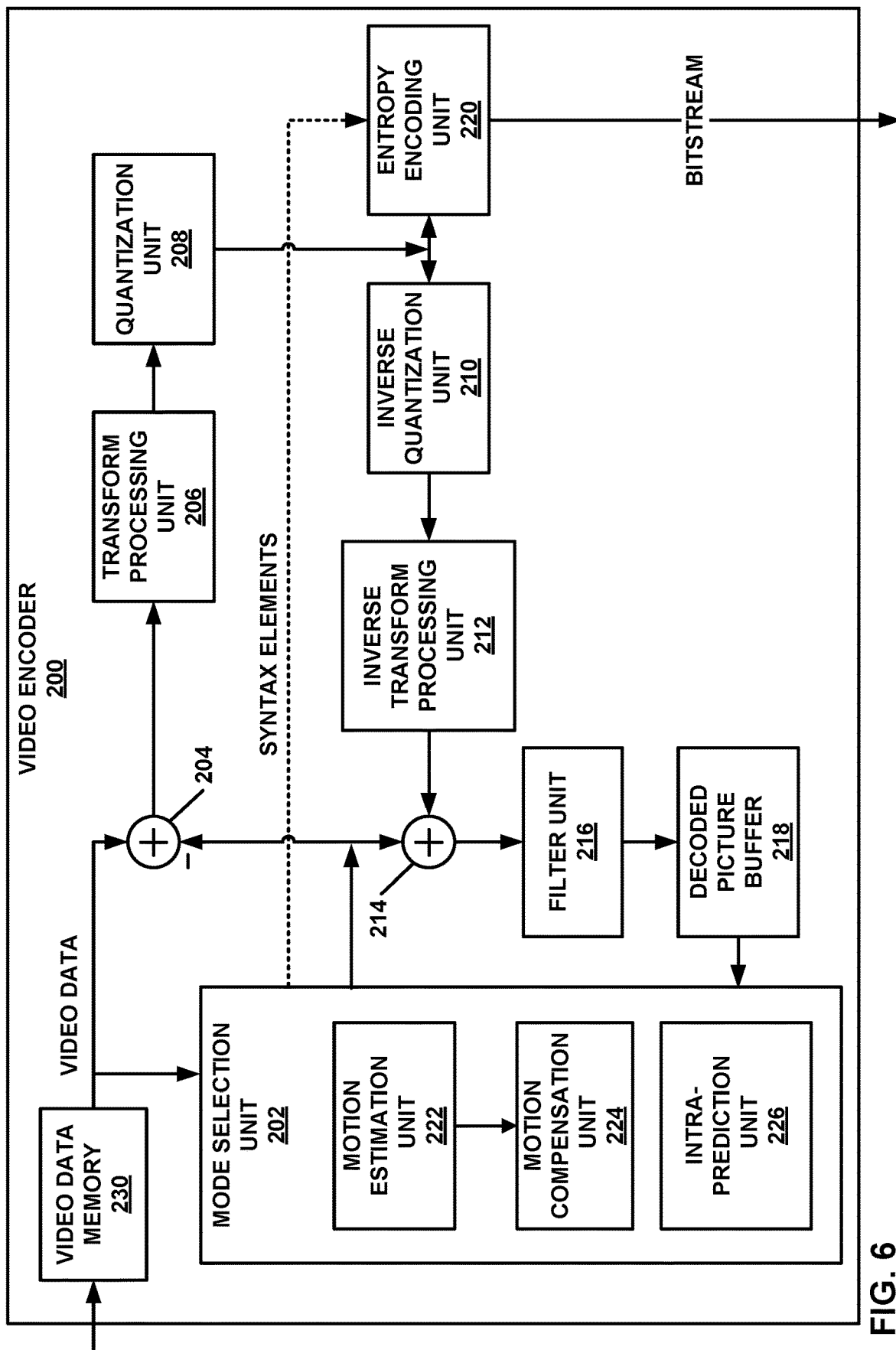
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 210 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 224 are not needed, reconstruction unit 214 may store reconstructed blocks to DPB 218. In examples where operations of filter unit 224 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Entropy encoding unit 220 and filter unit 216, potentially in conjunction with other portions of video encoder 200 represent processing units that may be configured to perform the techniques of this disclosure. Accordingly, video encoder 200 represents an example of a device configured to encode video data including a memory configured to store video data and one or more processing units implemented in circuitry and configured to encode a first syntax element (e.g., alf_blk_enable_flag[i][0]) indicating whether an adaptive loop filter is enabled or disabled for a luma block of the video data; determine a context for a second syntax element (e.g., alf_blk_enable_flag[i][1] and/or alf_blk_enable_flag [i][2]) based on a value of the first syntax element; and encode a value for the second syntax element based on the determined context.

Video encoder 200 also represents an example of a device configured to encode video data including a memory configured to store video data, and one or more processing units implemented in circuitry and configured to encode a slice-level syntax element, where a first value for the slice-level syntax element indicates that a value for a block-level syntax element (e.g., alf_blk_enable_flag[i][j]) is signaled in the video data and a second value for the slice-level syntax element indicates that the value for the block-level syntax element is inferred. The block level syntax indicates whether an adaptive loop filter is enabled or disabled for a component (e.g., luma, chroma cr, or chroma cb) of a block of the video data.

Figure 7:
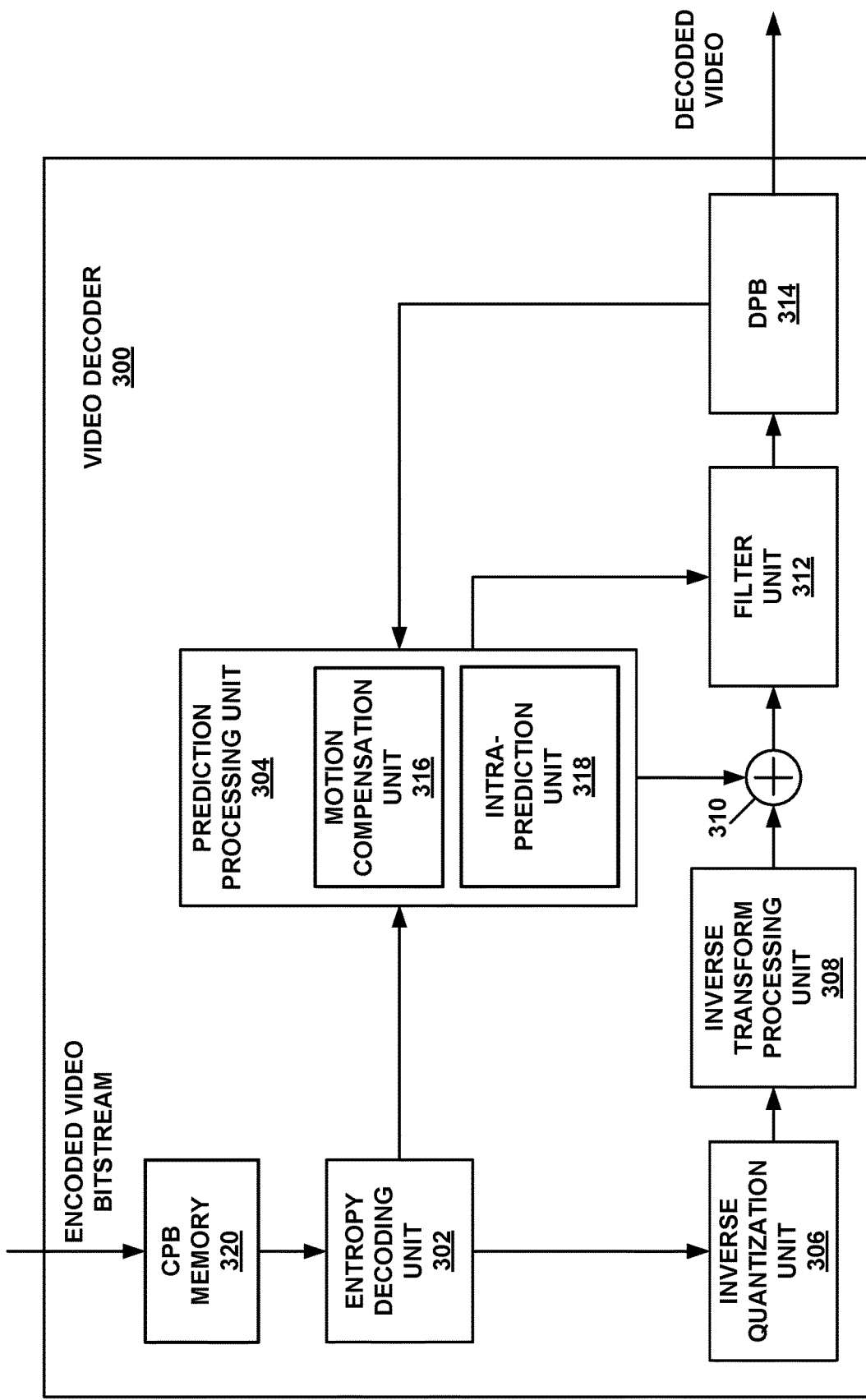
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Entropy decoding unit 302 and filter unit 312, potentially in conjunction with other portions of video decoder 300 represent processing units that may be configured to perform the techniques of this disclosure. In this manner, video decoder 300 represents an example of a video decoding device including a memory configured to store video data, and one or more processing units implemented in circuitry and configured to receive a first syntax element (e.g., alf_blk_enable_flag[i][0]) indicating whether an adaptive loop filter is enabled or disabled for a luma block of the video data; determine a context for a second syntax element (e.g., alf_blk_enable_flag[i][1] and/or alf_blk_enable_flag[i][2]) based on a value of the first syntax element; and decode a value for the second syntax element based on the determined context. The value of the second syntax element indicates whether the adaptive loop filter is enabled or disabled for a chroma block (cb or cr) of the video data.

Video decoder 300 represents an example of a video decoding device including a memory configured to store video data, and one or more processing units implemented in circuitry and configured to receive a slice-level syntax element, where a first value for the slice-level syntax element indicates that a value for a block-level syntax element (e.g., alf_blk_enable_flag[i][j]) is signaled in the video data and a second value for the slice-level syntax element indicates that the value for the block-level syntax element is inferred. The block level syntax indicates whether an adaptive loop filter is enabled or disabled for a component (e.g., luma, chroma cb, or chroma cr) of a block of the video data.

Figure 8:
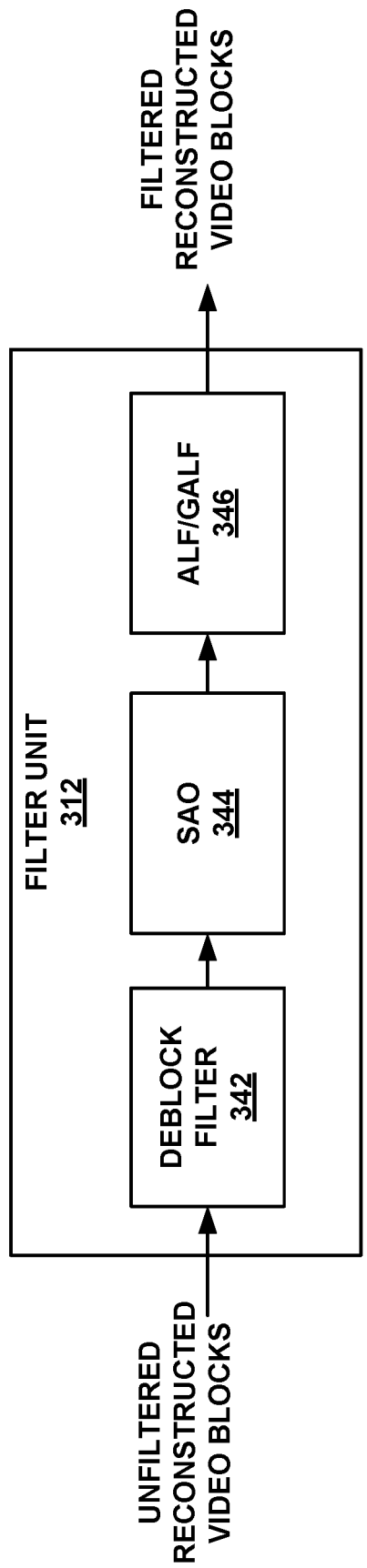
FIG. 8 is a block diagram illustrating an example filter unit for performing the techniques of this disclosure.

FIG. 8 shows an example implementation of filter unit 312 in FIG. 7. Filter unit 216 in FIG. 6 may be implemented in the same manner. Filter units 216 and 312 may perform the techniques of this disclosure, possibly in conjunction with other components of video encoder 200 or video decoder 300. In the example of FIG. 8, filter unit 312 includes deblock filter 342, SAO filter 344, and ALF/GLAF filter 346. SAO filter 344 may, for example, be configured to determine offset values for samples of a block in the manner described in this disclosure. ALF/GALF 346 may likewise filter blocks of video data in the manner described in this disclosure.

Filter unit 312 may include fewer filters and/or may include additional filters. Additionally, the particular filters shown in FIG. 8 may be implemented in a different order. Other loop filters (either in the coding loop or after the coding loop) may also be used to smooth pixel transitions or otherwise improve the video quality. The filtered reconstructed video blocks output by filter unit 312 may be stored in DPB 314, which stores reference pictures used for subsequent motion compensation. DPB 314 may be part of or separate from additional memory that stores decoded video for later presentation on a display device, such as display device 118 of FIG. 1.

Figure 9A:
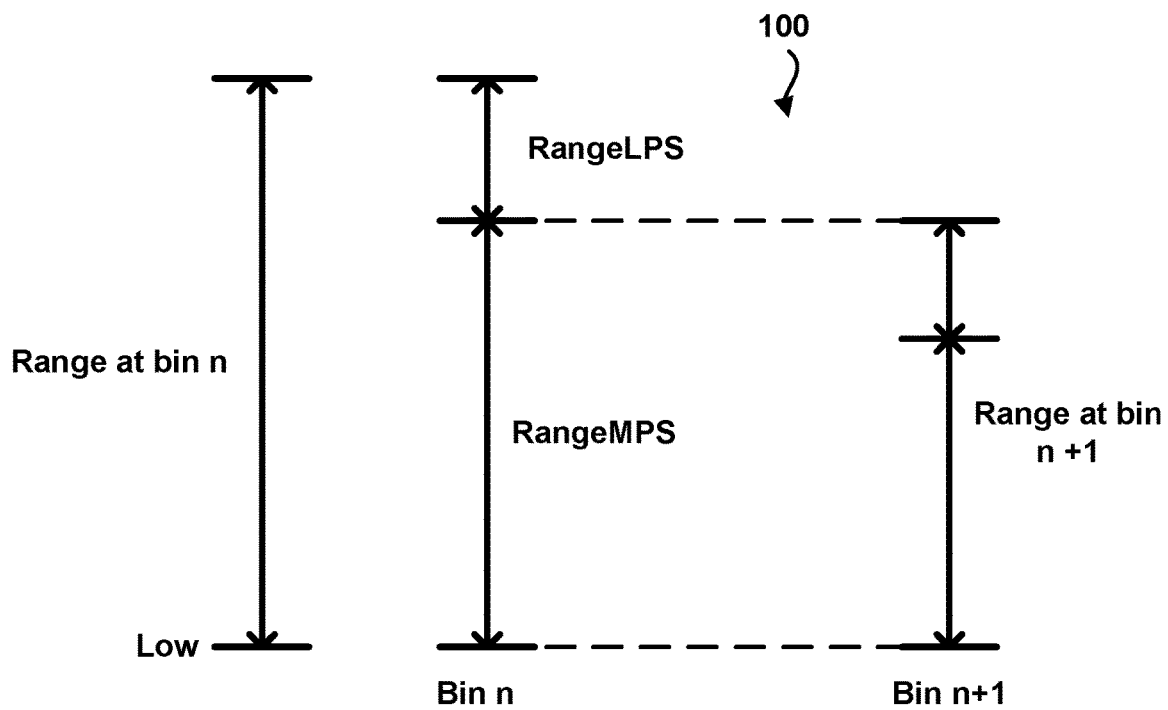
FIGS. 9A and 9B are conceptual diagrams illustrating a range update process in binary arithmetic coding.
Figure 9B:
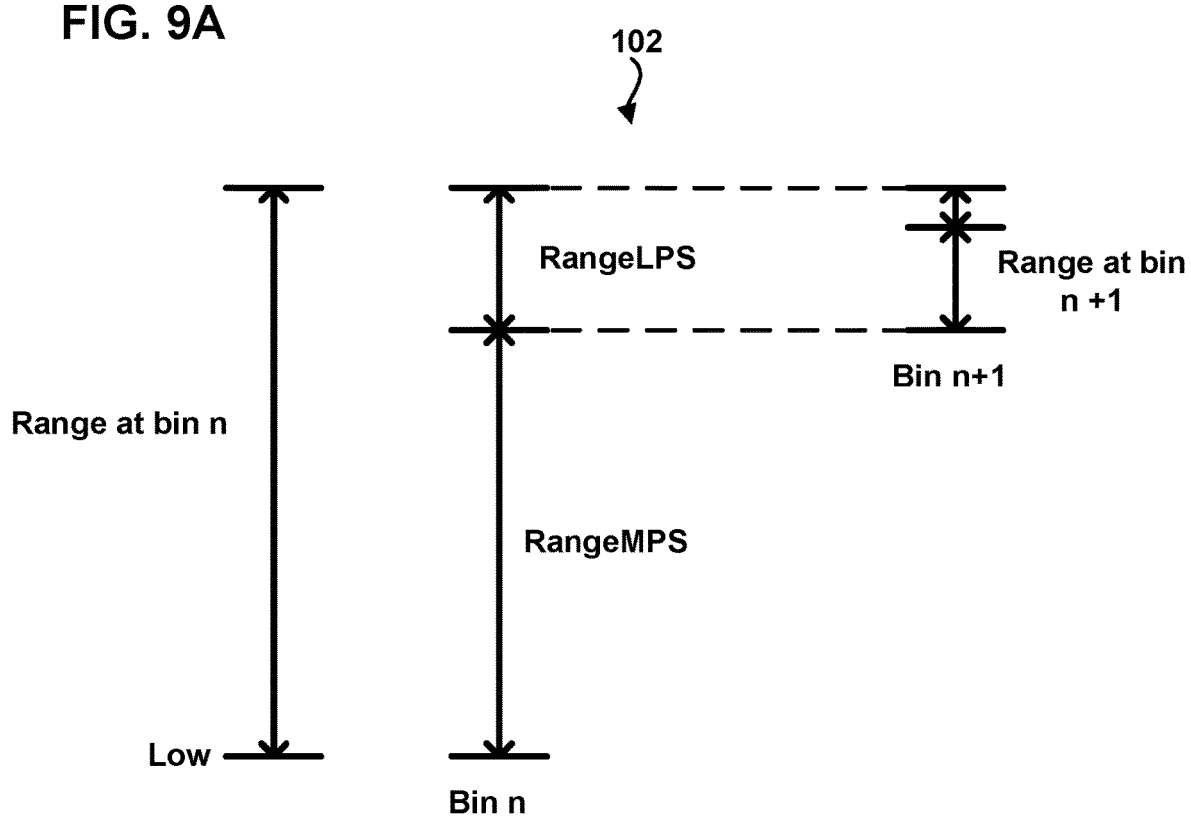

FIGS. 9A and 9B show examples of a CABAC process at a bin n. In example 100 of FIG. 9A, at bin n the range at bin 2 includes the RangeMPS and RangeLPS given by the probability of the least probable symbol (LPS) ($p_\sigma$) given a certain context state ($\sigma$). Example 100 shows the update of the range at bin n+1 when the value of bin n is equal to the most probable symbol (MPS). In this example, the low stays the same, but the value of the range at bin n+1 is reduced to the value of RangeMPS at bin n. Example 102 of FIG. 9B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 10:
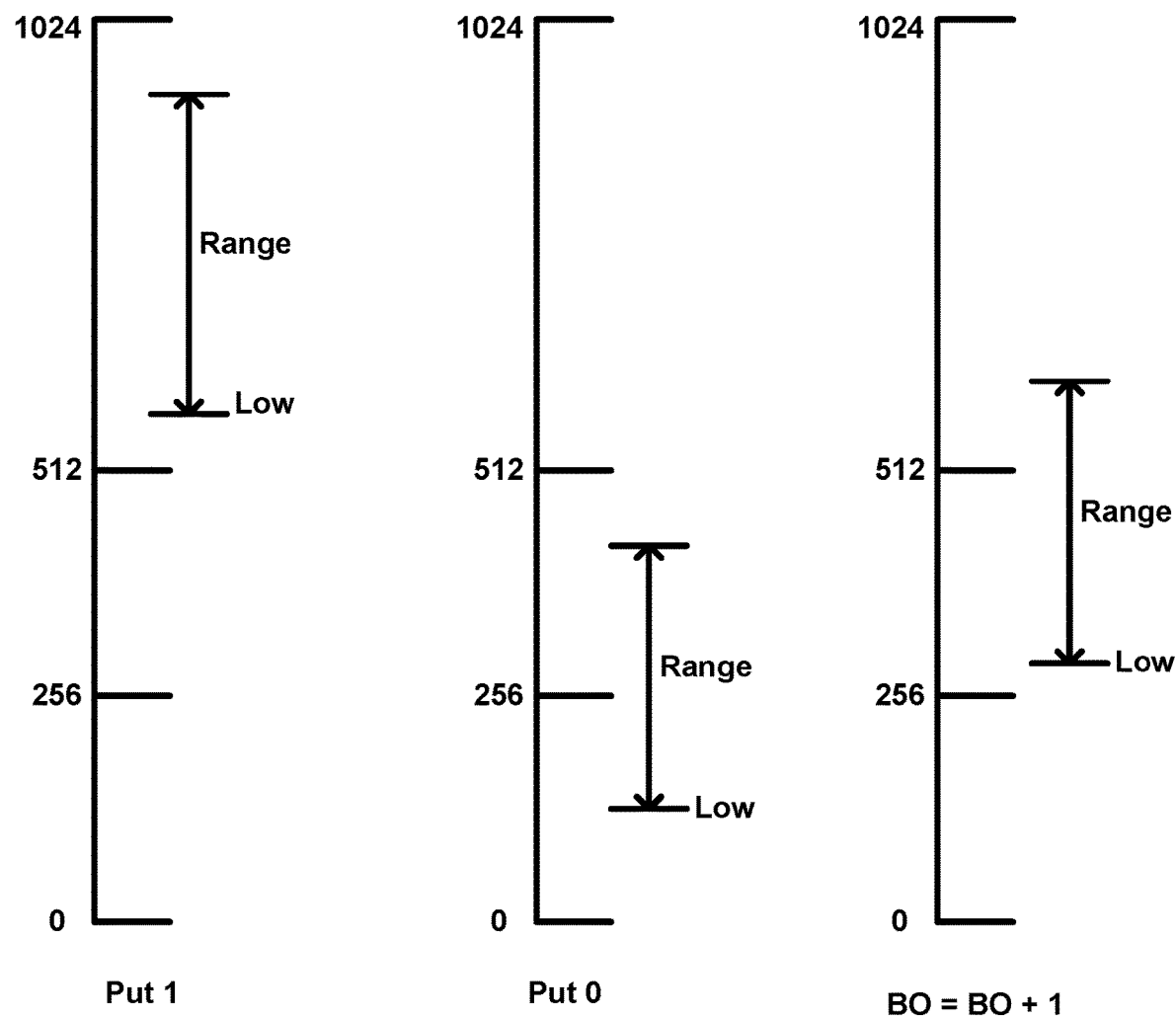
FIG. 10 is a conceptual diagram illustrating an output process in binary arithmetic coding.

In one example of the HEVC video coding process, range is expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the binary arithmetic coder (BAC) outputs to the bitstream, a '0,' or a '1,' or updates an internal variable (called BO: bits-outstanding) to keep for future outputs. FIG. 10 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

In the CABAC context model of H.264/AVC and in some examples of HEVC, there are 128 states. There are 64 possible LPS probabilities (denoted by state $\sigma$) that can be from 0 to 63. Each MPS can be zero or one. As such, the 128 states are 64 state probabilities times the 2 possible values for MPS (0 or 1). Therefore, the state can be indexed with 7 bits.

To reduce the computation of deriving LPS ranges (rangeLPS$_\sigma$), results for all cases may pre-calculated and stored as approximations in a look-up table. Therefore, the LPS range can be obtained without any multiplication by using a simple table lookup. Avoiding multiplication can be important for some devices or applications, since this operation may cause significant latency in many hardware architectures.

A 4-column pre-calculated LPS range table may be used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

Range Index

| | Range | | | |
|---|---|---|---|---|
| | 256-319 | 320-383 | 384-447 | 448-511 |
| (range >>6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63.

TABLE 2

RangeLPS

| Prob State ($\sigma$) | RangeLPS | | | |
|---|---|---|---|---|
| | Index 0 | | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state, is pre-defined. In other words, the LPS range of a probability state, is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. The probability p for each state is derived as follows:

$$p_\sigma = \alpha p_{\sigma-1}$$

where the state $\sigma$ is from 0 to 63. The constant $\alpha$ represents the amount of probability change between each context state. In one example, $\alpha=0.9493$, or, more precisely, $\alpha=(0.01875/0.5)^{1/63}$. The probability at state $\sigma=0$ is equal to 0.5 (i.e., $p_0=\frac{1}{2}$). That is, at context state 0, the LPS and MPS are equally probable. The probability at each successive state is derived by multiplying the previous state by $\alpha$. As such, the probability of the LPS occurring at context state $\alpha=1$ is $p_0*0.9493$ (0.5*0.9493=0.47465). As such, as the index of state $\alpha$ increases, the probability of the LPS occurring goes down.

CABAC is adaptive because the probability states are updated in order to follow the signal statistics (i.e., the values of previously coded bins). The update process is as follows. For a given probability state, the update depends on the state index and the value of the encoded symbol identified either as an LPS or an MPS. As a result of the updating process, a new probability state is derived, which consists of a potentially modified LPS probability estimate and, if necessary, a modified MPS value.

In the event of a bin value equaling the MPS, a given state index may be incremented by 1. This is for all states except when an MPS occurs at state index 62, where the LPS probability is already at its minimum (or equivalently, the maximum MPS probability is reached). In this case, the state index 62 remains fixed until an LPS is seen, or the last bin value is encoded (state 63 is used for the special case of the last bin value). When an LPS occurs, the state index is changed by decrementing the state index by a certain amount, as shown in the equation below. This rule applies in general to each occurrence of a LPS with the following exception. Assuming a LPS has been encoded at the state with index $\sigma=0$, which corresponds to the equi-probable case, the state index remains fixed, but the MPS value will be toggled such that the value of the LPS and MPS will be interchanged. In all other cases, no matter which symbol has been encoded, the MPS value will not be altered. The derivation of the transition rules for the LPS probability is based on the following relation between a given LPS probability $p_{old}$ and its updated counterpart $p_{new}$:

$$p_{new} = \max(\alpha p_{old}, p_{62}) \text{ if a MPS occurs}$$

$$p_{new} = (1-\alpha) + \alpha p_{old} \text{ if a LPS occurs}$$

With regard to a practical implementation of the probability estimation process in CABAC, it is important to note that all transition rules may be realized by at most two tables each having 63 entries of 6-bit unsigned integer values. In some examples, state transitions may be determined with a single table TransIdxLPS, which determines, for a given state index $\sigma$, the new updated state index TransIdxLPS [$\sigma$] in case an LPS has been observed. The MPS-driven transitions can be obtained by a simple (saturated) increment of the state index by the fixed value of 1, resulting in an updated state index min($\sigma+1$, 62). Table 3 below is an example of a partial TransIdxLPS table.

TABLE 3

TransIdxLPS

| Prob State ($\sigma$) | New State TransIdxLPS [$\sigma$] |
|---|---|
| ... | ... |
| 9 | 6 |
| 10 | 8 |
| 11 | 8 |
| 12 | 8 |
| ... | ... |

Previous BAC approaches (e.g., the BAC approach used in H.264/AVC), is that the tables RangeLPS and TransIdxLPS are tuned for low resolution videos, (i.e., common intermediate format (CIF) and quarter-CIF (QCIF) videos). Currently, a large amount of video content is high definition (HD) and, in some cases, greater than HD. Video content that is HD or greater than HD resolution has different statistics than the 10-year-old QCIF sequences used to develop H.264/AVC.

As such, tables RangeLPS and TransIdxLPS from H.264/AVC may cause adaptation between states in a manner that is too quick. That is, the transitions between probability states, especially when an LPS occurs, can be too great for the smoother, higher resolution content of HD video. Thus, the probability models used according to conventional techniques are not as accurate for HD and extra-HD content. In addition, as HD video content includes a greater range of pixel values, the H.264/AVC tables do not include enough entries to account for the more extreme values that may be present in HD content.

As such, there is a need for the RangeLPS and TransIdxLPS tables to be modified to account for the characteristics of this new content. This also implies that BAC should be different in at least two aspects. One difference is that BAC processes should use tables that allow for a slower adaptation process. Another difference is that BAC processes should account for more extreme cases (i.e., skewed probabilities).

The current RangeLPS and TransIdxLPS tables can be modified to achieve these goals by simply including more probability states and ranges. However, this solution incurs a substantial increase in the sizes of the tables. Slower adaptation may be achieved by using a parameter $\alpha$ closer to 1 than the currently used parameter $\alpha$ (e.g., $\alpha=0.9493$). However, using a larger value of $\alpha$ causes the probabilities to tend to 0 more slowly, and as such, more states are needed. In addition, to achieve slower adaptation, it may be beneficial if the lowest possible probability is much lower than the currently used lowest probability. As such, even more states may be needed to reach that very low probability value.

This disclosure describes techniques to modify BAC so as to attain slower adaptation and more skewed probabilities while keeping the table sizes (e.g., the RangeLPS and TransIdxLPS tables) at a practical level. In other words, this disclosure describes techniques to achieve slower adaptation and more extreme probabilities (i.e., probabilities closer to 0 and 1) while using relatively small-sized tables.

The techniques described in this disclosure may use more probability states, e.g., more probability states than used in BAC with H.264/AVC or HEVC. In this case, the TransIdxLPS table can obtain slower adaptation and lower probabilities. In one example, the techniques described in this disclosure may use 128 probability states instead of 64. This increases the table TransIdxLPS by 64 entries (i.e., 128 entries instead of 64). This increase allows for slower adaptation and lower minimal probability. As one example, by setting the parameter $\alpha=0.9689$, the differences between contiguous probabilities become smaller. Additionally, the lowest minimum probability goes down to 0.009, which is around one-half of the H.264/AVC case (i.e., 0.01875). Other numbers of states and $\alpha$ values are also possible, though, in general, the number of states may be increased and the value of $\alpha$ may be closer to 1 than the H.264/AVC case of $\alpha=0.9493$.

Another parameter that might be modified to improve HD or extra-HD coding is the parameter $p_0$. The value of $p_0$ generally indicates the maximum probability for the LPS. The reason to consider this possibility is that having a lower $p_0$ means that the minimal probability also decreases. The value of $p_0$ is set to 0.5 in the conventional BAC process. This disclosure proposes to allow for other values for $p_0$. Having other values of $p_0$ lower than 0.5 allows for smoother transitions at state 0 when the MPS/LPS swap occurs. In one example, $p_0$ may be equal to 0.493, although many other examples could also be used.

Usually, each probability state has its own entry in the RangeLPS table. The table size may be represented as:

probability states×# quantized range indexes which is 64×4=256 bytes in some proposals for HEVC. Since the number of states would increase in examples of this disclosure (doubled in the example above), the RangeLPS table size may be 128×4=512 bytes. To avoid this increase in the RangeLPS table size, however, this disclosure further proposes to map the probability states indexes to a lower size (i.e., a few number of indexes) to index the RangeLPS size. In other words, this disclosure proposes to decouple the state transition process from the range computation process. This means, in the current example, that there is a map for the states to range computation. Video encoder 200 and/or video decoder 300 may be configured to map an index indicating the determined probability state to one of a plurality of grouped indexes (e.g., grouped index for a RangeLPS table), with at least one of the grouped indexes representing at least two of the plurality of probability states. As such, the RangeLPS table (or other BAC tables) may use fewer indexes than there are probability states.

In one example of the disclosure, the probability state number may be divided by two to generate a new index to use as an entry for the RangeLPS table. In this case, the 128 probability states are reduced to 64 entries. Consequently, the RangeLPS table can keep the current size as used in H.264/AVC. Therefore, instead of using the probability state σ to index the entry in the range LPS table, the techniques described in this disclosure employ (σ>>1), that is, the state σ is divided by two and rounded to the lower integer for use as a grouped index into the RangeLPS table. The division can be by a larger number if the RangeLPS table is desired to be smaller for a given implementation, or if the number of states is larger (e.g., 256 probability states). In this context, each grouped index represents two probability states. In other examples of the disclosure, the grouped indexes may represent two or more probability states.

From an optimal entropy point of view, the grouping of the states for the RangeLPS table by using the division or right bit-shift operation may be beneficial, but may not always be the optimal technique. The optimal grouping may depend on several factors, including the number of states and the parameter α, among others. The most desirable (and possibly optimal) grouping might not be a straightforward operation like the bit-shift operation. In general, the grouping can be described with a table, going from the total number of probability states to a reduced number of probability states (i.e., grouped states). In another example, this disclosure proposes to use this kind of table. This approach would enhance performance (compared to the division or right shifting), at the cost of additional memory. As such, this example is a trade-off between memory and performance, favoring better performance over the linear mapping example (i.e., the division or right shifting).

Hence, although a linear mapping of probability states to entries in the RangeLPS table may be used, it may be desirable to provide a nonlinear mapping. For example, the probability states may be mapped according to a logarithmic mapping. A logarithmic mapping may be achieved, in some examples, using piecewise linear mapping techniques. In general, such a mapping may be defined using a table, such as a precomputed mapping table.

In general, the techniques described in this disclosure may be performed, in some examples, by a method or device for entropy coding video data. The method may include determining a probability state of symbols in a binary arithmetic coding process, where the probability state may be one of a plurality of probability states, and mapping an index indicating the determined probability state to one of a plurality of grouped indexes, where at least one of the grouped indexes represents at least two of the plurality of probability states, and where each of the grouped indexes points to a range for a lowest probability symbol in a table.

In some examples, the number of probability states may be greater than 64. For example, the number of probability states may be 128. In some examples, the number of grouped indexes used as an input into the RangeLPS table is 64. In particular, the number of probability states may be 128 and the number of grouped indexes used as an input into the RangeLPS table may be 64. A symbol may be coded based on the grouped indexes, e.g., according to a table based on the probability state index, or according to a mathematical operation based on the index. The determined probability state maps to one of a plurality of indexes according to a table, or according to a mathematical operation. The mapping may be linear or nonlinear. For example, the mapping may be performed according to a divide-by-two operation. In some examples, the mapping may be a logarithmic mapping. In some examples, a piecewise linear mapping may be used to define a logarithmic mapping. In some examples, the value $p_0$ of the maximum probability for the LPS may be less than 0.5.

The techniques described in this disclosure may be performed, for example, within a video encoder, video decoder, or combined video encoder-decoder (CODEC). In particular, such techniques may be performed in an entropy encoding unit of a video encoder and/or an entropy decoding unit of a video decoder. The techniques may be performed, for example, within a CABAC process, which may be configured to support video coding, such as video coding according to aspects of the HEVC standard Entropy encoding and decoding units may apply coding processes in a reciprocal or inverse manner, e.g., to encode or decode any of a variety of video data, such as quantized transform coefficients associated with residual video data, motion vector information, syntax elements, and other types of information that may be useful in a video encoding and/or video decoding process.

Figure 11:
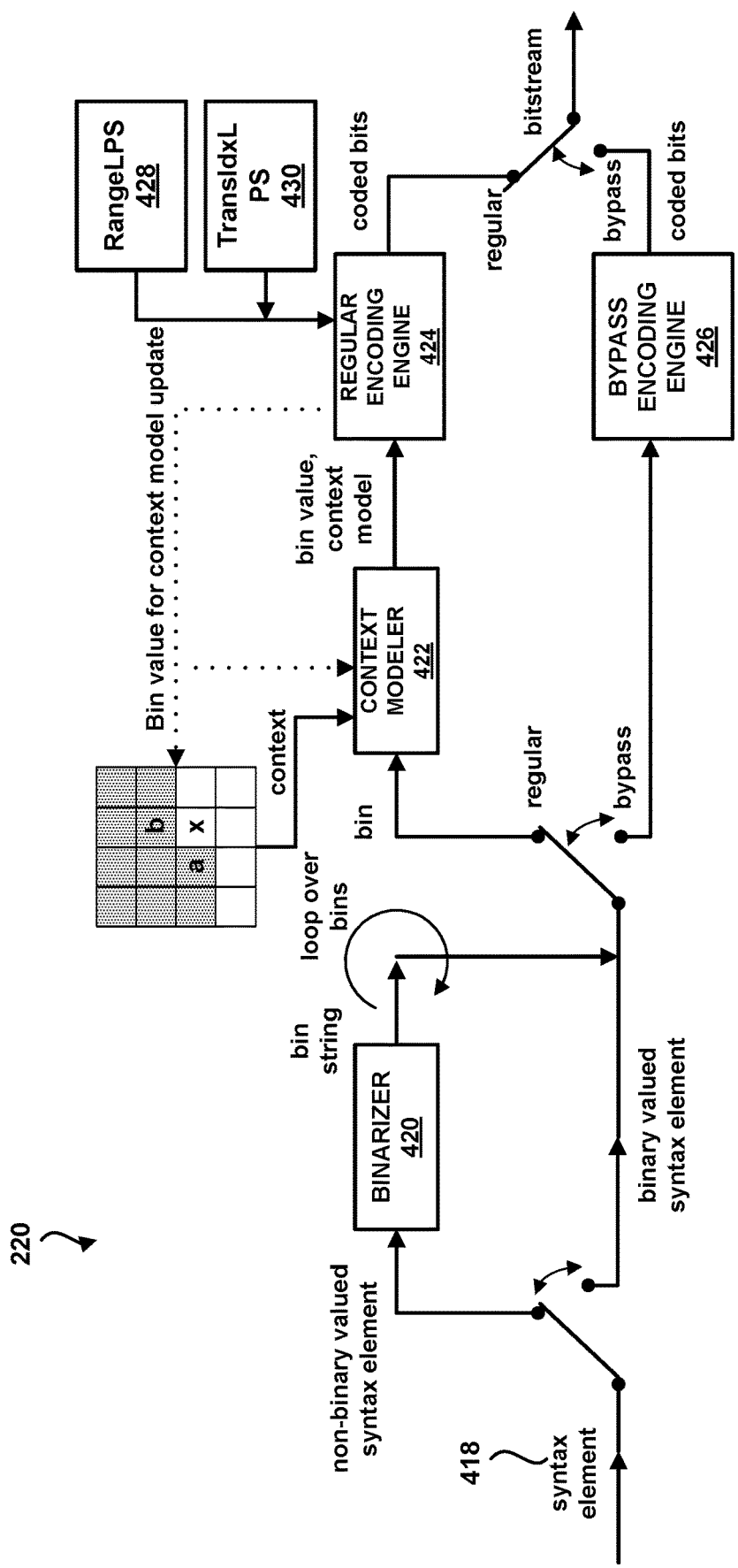
FIG. 11 is a block diagram illustrating a context adaptive binary arithmetic coding (CABAC) coder in a video encoder.

FIG. 11 is a block diagram of an example entropy encoding unit 220 that may be configured to perform CABAC in accordance with the techniques of this disclosure. A syntax element 418 is input into the entropy encoding unit 220. If the syntax element is already a binary-value syntax element (i.e., a syntax element that only has a value of 0 and 1), the step of binarization may be skipped. If the syntax element is a non-binary valued syntax element (e.g., a syntax element represented by multiple bits, such as transform coefficient levels), the non-binary valued syntax element is binarized by binarizer 420. Binarizer 420 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 420 is fed to the binary arithmetic coding side of entropy encoding unit 220. That is, for a predetermined set of non-binary valued syntax elements, each bin type (e.g., bin 0) is coded before the next bin type (e.g., bin 1). Coding may be performed in either regular mode or bypass mode. In bypass mode, bypass coding engine 426 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 422. Context modeler 422 outputs the bin value and the context model (e.g., the probability state σ). The context model may be an initial context model for a series of bins or may be determined based on the coded values of previously coded bins. As described above, the context modeler may update the state based on whether or not the previously-coded bin was an MPS or an LPS.

After the context model and probability state σ are determined by context modeler 422, regular coding engine 424 performs BAC on the bin value. According to the techniques of this disclosure, regular coding engine 424 performs BAC using TransIdxLPS table 430 that includes more than 64 probability states σ. In one example, the number of probability states is 428. TransIdxLPS is used to determine which probability state is used for a next bin (bin n+1) when the previous bin (bin n) is an LPS. Regular coding engine 424 may also use a RangeLPS table 428 to determine the range value for an LPS given a particular probability state σ. However, according to the techniques of this disclosure, rather than using all possible probability states σ of the TransIdxLPS table 430, the probability state indexes σ are mapped to grouped indexes for use in the RangeLPS table. That is, each index into the RangeLPS table 428 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example, α=0.9689. In another example of the disclosure, the highest probability ($p_0$) of an LPS occurring may be set to be lower than 0.5. In one example, $p_0$ may be equal to 0.493.

In accordance with one or more techniques of this disclosure, as opposed to using the same value of a variable used to update a probability state in a binary arithmetic coding process (e.g., one or more of a window size, a scaling factor (a), and a probability updating speed), entropy encoding unit 220 may use different values of the variable for different context models and/or different syntax elements. For instance, entropy encoding unit 220 may determine, for a context model of a plurality of context models, a value of a variable used to update a probability state in a binary arithmetic coding process and update the probability state based on the determined value.

Figure 12:
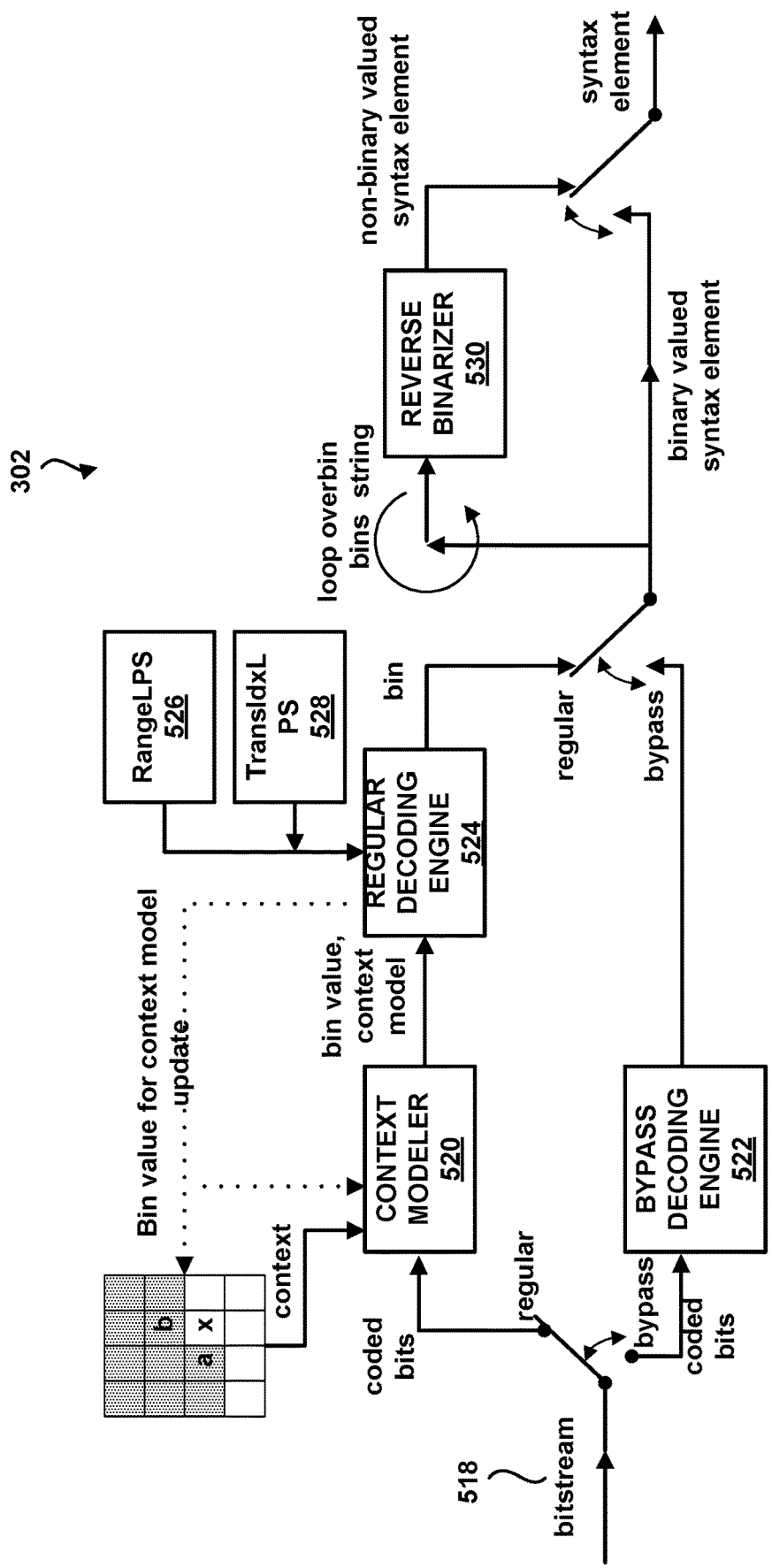
FIG. 12 is a block diagram illustrating a CABAC coder in a video decoder.

FIG. 12 is a block diagram of an example entropy decoding unit 302 that may be configured to perform CABAC in accordance with the techniques of this disclosure. The entropy decoding unit 302 of FIG. 7 performs CABAC in an inverse manner as that of entropy encoding unit 220 described in FIG. 6. Coded bits from bitstream 518 are input into entropy decoding unit 302. The coded bits are fed to either context modeler 520 or bypass coding engine 522 based on whether or not the coded bits were entropy coded using bypass mode or regular mode. If the coded bits were coded in bypass mode, bypass decoding engine 522 may, for example, use Golomb-Rice or exponential Golomb decoding to retrieve the binary-valued syntax elements or bins of non-binary syntax elements.

If the coded bits were coded in regular mode, context modeler 520 may determine a probability model for the coded bits and regular decoding engine 524 may decode the coded bits to produce bins of non-binary valued syntax elements (or the syntax elements themselves if binary-valued). After the context model and probability state σ is determined by context modeler 520, regular decoding engine 524 performs BAC on the bin value. According to the techniques of this disclosure, regular decoding engine 524 performs BAC using TransIdxLPS table 528 that includes more than 64 probability states σ. In one example, the number of probability states is 128, although other numbers of probability states could be defined, consistent with the techniques of this disclosure. TransIdxLPS table 528 is used to determine which probability state is used for a next bin (bin n+1) when the previous bin (bin n) is an LPS. Regular decoding engine 524 may also use a RangeLPS table 526 to determine the range value for an LPS given a particular probability state σ. However, according to the techniques of this disclosure, rather than using all possible probability states σ of the TransIdxLPS table 528, the probability state indexes σ are mapped to grouped indexes for use in RangeLPS table 526. That is, each index into RangeLPS table 526 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example, α=0.9689. In another example of the disclosure, the highest probability ($p_0$) of an LPS occurring may be set to be lower than 0.5. In one example, $p_0$ may be equal to 0.493.

After the bins are decoded by regular decoding engine 524, a reverse binarizer 530 may perform a reverse mapping to convert the bins back into the values of the non-binary valued syntax elements.

Figure 13:
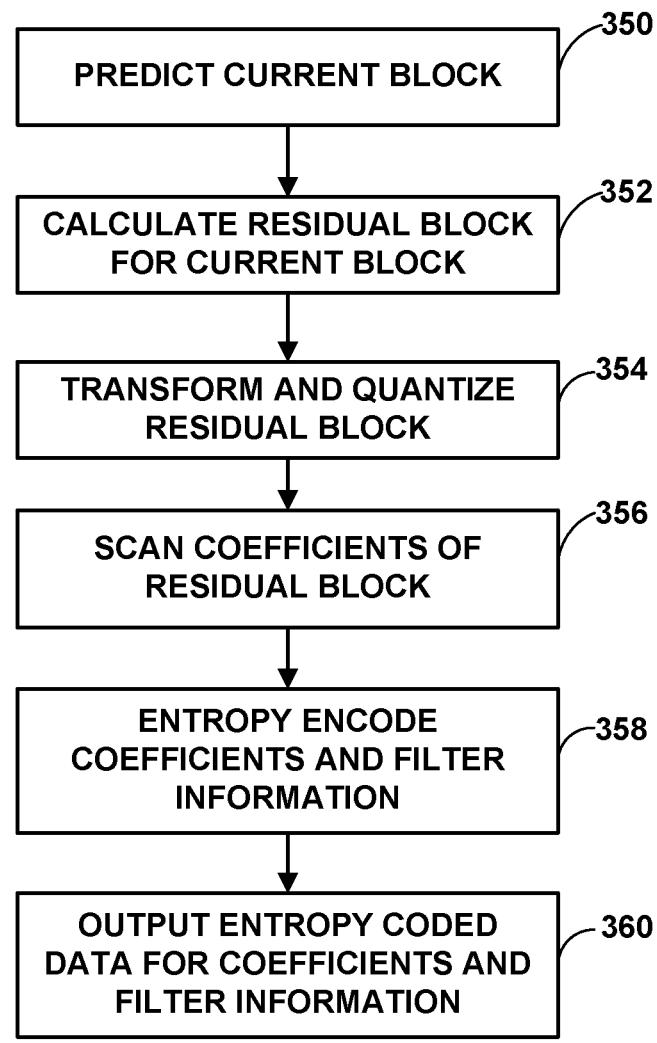
FIG. 13 is a flowchart illustrating an example video encoding process.

FIG. 13 is a flowchart illustrating an example process for encoding a current block. The current block may include a current CU. Although described with respect to video encoder 200 (FIGS. 1 and 2), it should be understood that other devices may be configured to perform a method similar to that of FIG. 13.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients and filter information (358). For example, video encoder 200 may encode information indicating whether an adaptive loop filter is enabled or disabled for the current block, in accordance with the techniques of this disclosure. Video encoder 200 may encode the coefficients and filter information using CAVLC or CABAC. Video encoder 200 may then output the entropy coded data of the block (360).

Figure 14:
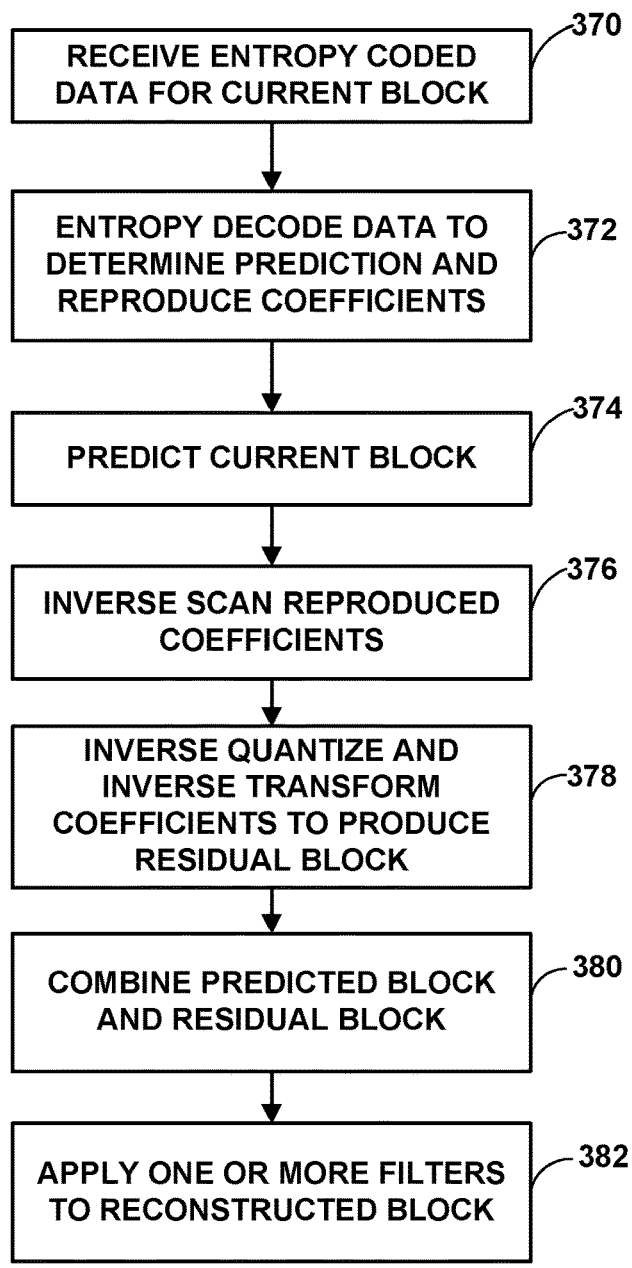
FIG. 14 is a flowchart illustrating an example video decoding process.

FIG. 14 is a flowchart illustrating an example process for decoding a current block of video data. The current block may include a current CU. Although described with respect to video decoder 300 (FIGS. 1 and 3), it should be understood that other devices may be configured to perform a method similar to that of FIG. 14.

Video decoder 300 may receive entropy coded data for the current block, such as entropy coded prediction information and entropy coded data for coefficients of a residual block corresponding to the current block (370). The entropy coded data may further include a first syntax element indicating whether an adaptive loop filter is enabled or disabled for the current block, in accordance with the techniques of this disclosure. Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block to form a reconstructed block (380). Video decoder 300 may then apply one or more filters, such as an ALF filter, to the reconstructed block (382) in accordance with the techniques of this disclosure, assuming the filter is enabled.

Figure 15:
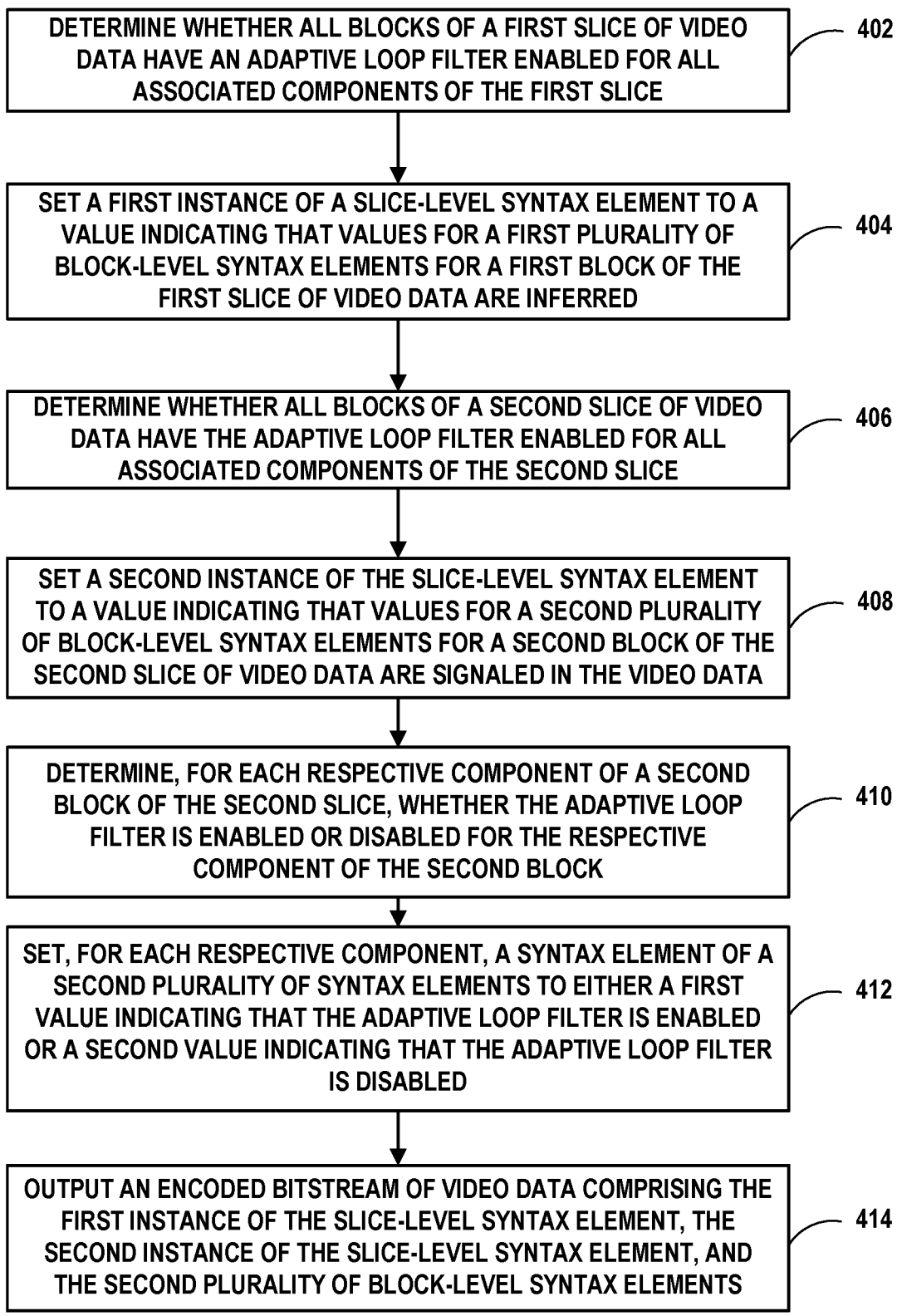
FIG. 15 is a flowchart illustrating an example video encoding process.

FIG. 15 is a flowchart illustrating an example process for encoding a current block. The current block may include a current CU. Although described with respect to video encoder 200 (FIGS. 1 and 6), it should be understood that other devices may be configured to perform a method similar to that of FIG. 15.

In the example of FIG. 15, video encoder 200 determines whether all blocks of a first slice of video data have an adaptive loop filter enabled for all associated components of the first slice (402).

In response to determining that all blocks of the first slice of video data have the adaptive loop filter enabled for all associated components of the first slice, video encoder 200 sets a first instance of a slice-level syntax element to a value indicating that values for a first plurality of block-level syntax elements for a first block of the first slice of video data are inferred (404).

Video encoder 200 determines whether all blocks of a second slice of video data have the adaptive loop filter enabled for all associated components of the second slice (406). In response to determining that not all blocks of the second slice of video data have the adaptive loop filter enabled for all associated components of the second slice, video encoder 200 sets a second instance of the slice-level syntax element to a value indicating that values for a second plurality of block-level syntax elements for a second block of the second slice of video data are signaled in the video data (408). Video encoder 200 determines, for each respective component of a second block of the second slice, whether the adaptive loop filter is enabled or disabled for the respective component of the second block (410).

Based on determining whether the adaptive loop filter is enabled or disabled for the respective component of the second block, video encoder 200 sets, for each respective component, a syntax element of a second plurality of syntax elements to either a first value indicating that the adaptive loop filter is enabled or a second value indicating that the adaptive loop filter is disabled (412). Video encoder 200 outputs an encoded bitstream of video data comprising the first instance of the slice-level syntax element, the second instance of the slice-level syntax element, and the second plurality of block-level syntax elements (414).

Figure 16:
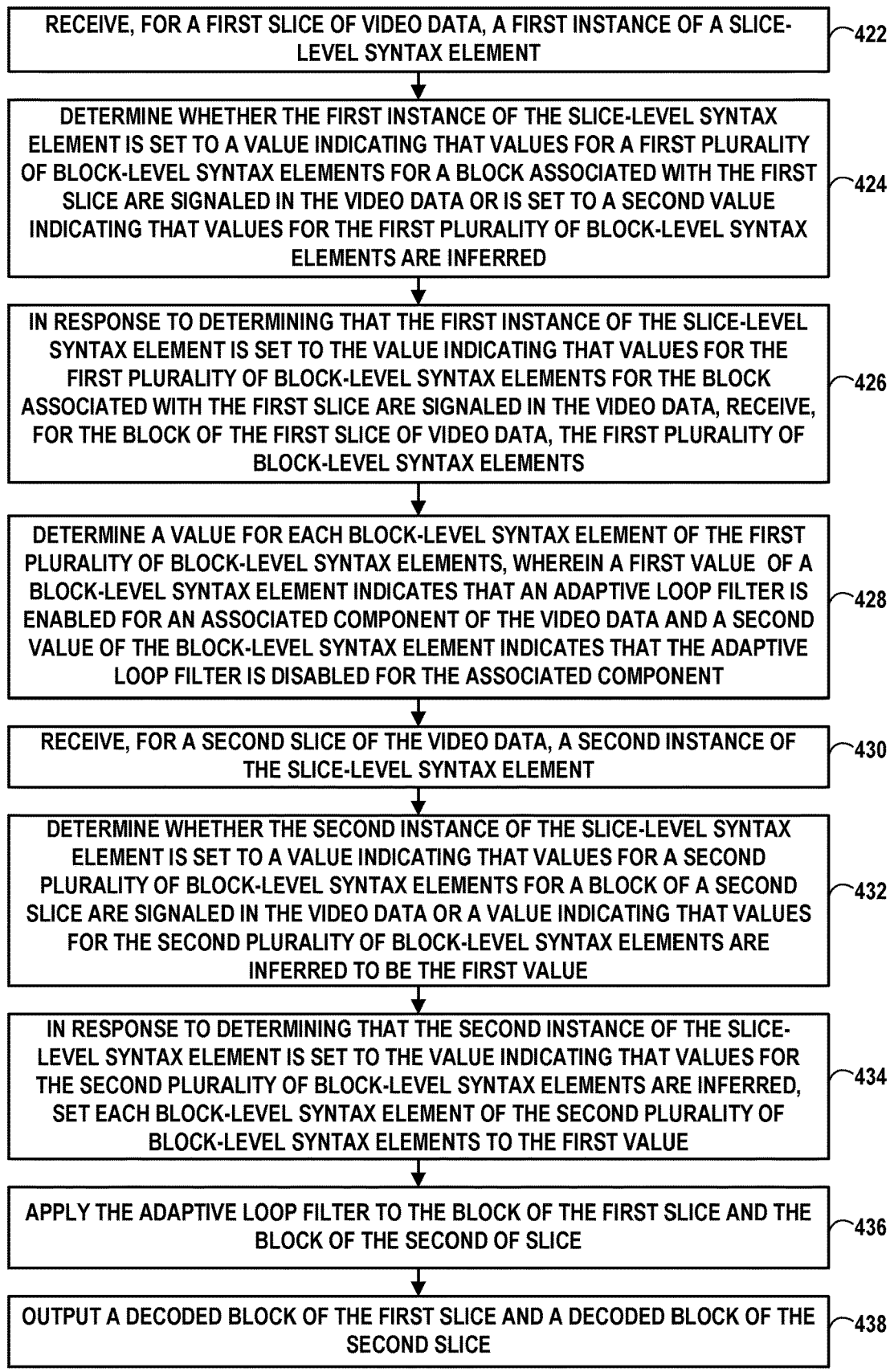
FIG. 16 is a flowchart illustrating an example video decoding process.

FIG. 16 is a flowchart illustrating an example process for decoding a current block of video data. The current block may include a current CU. Although described with respect to video decoder 300 (FIGS. 1 and 7), it should be understood that other devices may be configured to perform a method similar to that of FIG. 16.

In the example of FIG. 16, video decoder 300 receives, for a first slice of video data, a first instance of a slice-level syntax element (422). Video decoder 300 determines whether the first instance of the slice-level syntax element is set to a value indicating that values for a first plurality of block-level syntax elements for a block associated with the first slice are signaled in the video data or is set to a second value indicating that values for the first plurality of block-level syntax elements are inferred (424).

In response to determining that the first instance of the slice-level syntax element is set to the value indicating that values for the first plurality of block-level syntax elements for the block associated with the first slice are signaled in the video data, video decoder 300 receives, for the block of the first slice of video data, the first plurality of block-level syntax elements (426). The first plurality of block-level syntax elements may, for example, include a plurality of syntax elements indicating whether the adaptive loop filter is enabled or disabled for blocks of a luma component of the first slice. Additionally or alternatively, the first plurality of block-level syntax elements may include a plurality of syntax elements indicating whether the adaptive loop filter is enabled or disabled for blocks of a chroma component of the block of the first slice.

Video decoder 300 determines a value for each block-level syntax element of the first plurality of block-level syntax elements, wherein a first value of a block-level syntax element indicates that an adaptive loop filter is enabled for an associated component of the video data and a second value of the block-level syntax element indicates that the adaptive loop filter is disabled for the associated component (428).

Video decoder 300 receives, for a second slice of the video data, a second instance of the slice-level syntax element (430). Video decoder 300 determines whether the second instance of the slice-level syntax element is set to a value indicating that values for a second plurality of block-level syntax elements for a block of a second slice are signaled in the video data or a value indicating that values for the second plurality of block-level syntax elements are inferred to be the first value (432).

In response to determining that the second instance of the slice-level syntax element is set to the value indicating that values for the second plurality of block-level syntax elements are inferred, video decoder 300 sets each block-level syntax element of the second plurality of block-level syntax elements to the first value (434). The second plurality of block-level syntax elements may, for example, include a plurality of syntax elements indicating whether the adaptive loop filter is enabled or disabled for a luma component of the block of the second slice. Additionally or alternatively, the second plurality of block-level syntax elements may include a plurality of syntax elements indicating whether the adaptive loop filter is enabled or disabled for a chroma component of the block of the second slice.

Video decoder 300 applies the adaptive loop filter to the block of the first slice and the block of the second of slice (436). Video decoder 300 outputs a decoded block of the first slice and a decoded block of the second slice (438).

In some examples, to receive the first plurality of block-level syntax elements, video decoder 300 may decode a syntax element indicating whether the adaptive loop filter is enabled or disabled for blocks of a luma component of the first slice. Video decoder 300 may determine an entropy decoding context based on whether the syntax element indicates that the adaptive loop filter is enabled or disabled for the luma component of the block of the first slice and decode, based on the determined entropy decoding context, a syntax element indicating whether the adaptive loop filter is enabled or disabled for a first chroma component (cb) of the block of the second slice and a syntax element indicating that whether the adaptive loop filter is enabled or disabled for a second luma component (cr) of the block of the second slice. In response to receiving the second instance of the slice-level syntax element set to the value indicating that values for the second plurality of block-level syntax elements are inferred to be the first value, video decoder 300 infers the values for the second plurality of block-level syntax elements to be the first value without receiving, in the video data, instances of the second plurality of block-level syntax elements.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, for a first slice of video data, a first instance of slice-level syntax data;
   determining whether the first instance of the slice-level syntax data indicates that values for a first plurality of block-level syntax elements for a block associated with the first slice are signaled in the video data or indicates that values for the first plurality of block-level syntax elements are inferred;
   in response to determining that the first instance of the slice-level syntax data indicates that values for the first plurality of block-level syntax elements for the block associated with the first slice are signaled in the video data, receiving, for the first slice of video data, the first plurality of block-level syntax elements;
   determining a value for each block-level syntax element of the first plurality of block-level syntax elements, wherein for each of the first plurality of block-level syntax elements, a first value indicates that an adaptive loop filter is enabled for an associated component of a block and a second value indicates that the adaptive loop filter is disabled for the associated component of the block;
   receiving, for a second slice of the video data, a second instance of the slice-level syntax data;
   determining whether the second instance of the slice-level syntax data indicates that values for a second plurality of block-level syntax elements for the second slice are signaled in the video data or indicates that values for the second plurality of block-level syntax elements are inferred;
   in response to determining that the second instance of the slice-level syntax data indicates that values for the second plurality of block-level syntax elements are inferred, setting a value associated with each block-level syntax element of the second plurality of block-level syntax elements to the first value;
   applying the adaptive loop filter to components of blocks of the first slice in accordance with the first plurality of block-level syntax elements;
   applying the adaptive loop filter to components of blocks of the second slice in accordance with the second plurality of block-level syntax elements; and
   outputting a decoded version of the first slice and a decoded version of the second slice.

2. The method of claim 1, further comprising:
   in response to receiving the second instance of the slice-level syntax data indicating that values for the second plurality of block-level syntax elements are inferred to be the first value, inferring the values for the second plurality of block-level syntax elements to be the first value without receiving, in the video data, instances of the second plurality of block-level syntax elements.

3. The method of claim 1, wherein the first plurality of block-level syntax elements includes a plurality of syntax elements indicating whether the adaptive loop filter is enabled or disabled for blocks of a luma component of the first slice.

4. The method of claim 1, wherein the first plurality of block-level syntax elements includes a plurality of syntax elements indicating whether the adaptive loop filter is enabled or disabled for blocks of a chroma component of the first slice.

5. The method of claim 1, wherein the second plurality of block-level syntax elements includes a plurality of syntax elements indicating whether the adaptive loop filter is enabled or disabled for blocks of a luma component of the second slice.

6. The method of claim 1, wherein the second plurality of block-level syntax elements includes a plurality of syntax elements indicating whether the adaptive loop filter is enabled or disabled for blocks of a chroma component of the second slice.

7. The method of claim 1, wherein receiving the first plurality of block-level syntax elements comprises:
   decoding a syntax element indicating whether the adaptive loop filter is enabled or disabled for a luma component of the first slice;
   determining an entropy decoding context;
   decoding, based on the determined entropy decoding context, a syntax element indicating whether the adaptive loop filter is enabled or disabled for a first chroma component (cb) of the block of the second slice; and
   decoding, based on the determined entropy decoding context, a syntax element indicating whether the adaptive loop filter is enabled or disabled for a second chroma component (cr) of the block of the second slice.

8. A device for decoding video data, the device comprising:
   a memory configured to store video data; and one or more processors implemented in circuitry and configured to:
- receive, for a first slice of video data, a first instance of slice-level syntax data;
- determine whether the first instance of the slice-level syntax data indicates that values for a first plurality of block-level syntax elements for a block associated with the first slice are signaled in the video data or indicates that values for the first plurality of block-level syntax elements are inferred;
- in response to determining that the first instance of the slice-level syntax data indicates that values for the first plurality of block-level syntax elements for the block associated with the first slice are signaled in the video data, receive, for the block of the first slice of video data, the first plurality of block-level syntax elements;
- determining a value for each block-level syntax element of the first plurality of block-level syntax elements, wherein for each of the first plurality of block-level syntax elements, a first value indicates that an adaptive loop filter is enabled for an associated component of a block and a second value indicates that the adaptive loop filter is disabled for the associated component of the block;
- receive, for a second slice of the video data, a second instance of the slice-level syntax data;
- determine whether the second instance of the slice-level syntax data indicates that values for a second plurality of block-level syntax elements for the second slice are signaled in the video data or indicates that values for the second plurality of block-level syntax elements are inferred;
- in response to determining that the second instance of the slice-level syntax data indicates that values for the second plurality of block-level syntax elements are inferred, set a value associated with each block-level syntax element of the second plurality of block-level syntax elements to the first value;
- apply the adaptive loop filter to components of blocks of the first slice in accordance with the first plurality of block-level syntax elements;
- apply the adaptive loop filter to components of blocks of the second slice in accordance with the second plurality of block-level syntax elements; and
- output a decoded version of the first slice and a decoded version of the second slice.

9. The device of claim 8, wherein the one or more processors are further configured to:
- in response to receiving the second instance of the slice-level syntax data indicating that values for the second plurality of block-level syntax elements are inferred to be the first value, infer the values for the second plurality of block-level syntax elements to be the first value without receiving, in the video data, instances of the second plurality of block-level syntax elements.

10. The device of claim 8, wherein the first plurality of block-level syntax elements includes a plurality of syntax elements indicating whether the adaptive loop filter is enabled or disabled for blocks of a luma component of the first slice.

11. The device of claim 8, wherein the first plurality of block-level syntax elements includes a plurality of syntax elements indicating whether the adaptive loop filter is enabled or disabled for blocks of a chroma component of the first slice.

12. The device of claim 8, wherein the second plurality of block-level syntax elements includes a plurality of syntax elements indicating whether the adaptive loop filter is enabled or disabled for blocks of a luma component of the second slice.

13. The device of claim 8, wherein the second plurality of block-level syntax elements includes a plurality of syntax elements indicating whether the adaptive loop filter is enabled or disabled for blocks of a chroma component of the second slice.

14. The device of claim 8, wherein to receive the first plurality of block-level syntax elements, the one or more processors are further configured to:
- decode a syntax element indicating whether the adaptive loop filter is enabled or disabled for a luma component of the first slice;
- determine an entropy decoding context;
- decode, based on the determined entropy decoding context, a syntax element indicating whether the adaptive loop filter is enabled or disabled for a first chroma component (cb) of the block of the second slice; and
- decode, based on the determined entropy decoding context, a syntax element indicating whether the adaptive loop filter is enabled or disabled for a second chroma component (cr) of the block of the second slice.

15. The device of claim 8, wherein the device comprises a wireless communication device, further comprising a receiver configured to receive encoded video data.

16. The device of claim 15, wherein the wireless communication device comprises a telephone handset and wherein the receiver is configured to demodulate, according to a wireless communication standard, a signal comprising the encoded video data.

17. A non-transitory computer-readable medium storing instructions that when executed by one or more processor cause the one or moreprocessors to:
- receive, for a first slice of video data, a first instance of slice-level syntax data element;
- determine whether the first instance of the slice-level syntax data indicates that values for a first plurality of block-level syntax elements for a block associated with the first slice are signaled in the video data or indicates that values for the first plurality of block-level syntax elements are inferred;
- in response to determining that the first instance of the slice-level syntax data indicates that values for the first plurality of block-level syntax elements for the block associated with the first slice are signaled in the video data, receive, for the first slice of video data, the first plurality of block-level syntax elements;
- determining a value for each block-level syntax element of the first plurality of block-level syntax elements, wherein for each of the first plurality of block-level syntax elements, a first value indicates that an adaptive loop filter is enabled for an associated component of a block and a second value indicates that the adaptive loop filter is disabled for the associated component of the block;
- receive, for a second slice of the video data, a second instance of the slice-level syntax data;
- determine whether the second instance of the slice-level syntax data indicates that values for a second plurality of block-level syntax elements for the second slice are signaled in the video data or indicates that values for the second plurality of block-level syntax elements are inferred;
- in response to determining that the second instance of the slice-level syntax data indicates that values for the second plurality of block-level syntax elements are inferred, set a value associated with each block-level syntax element of the second plurality of block-level syntax elements to the first value;

apply the adaptive loop filter to components of blocks of the first slice in accordance with the first plurality of block-level syntax elements;

apply the adaptive loop filter to components of blocks of the second slice in accordance with the second plurality of block-level syntax elements; and output a decoded version of the first slice and a decoded version of the second slice.

18. The non-transitory computer-readable medium of claim 17, wherein the one or more processors are further configured to:

in response to receiving the second instance of the slice-level syntax data indicating that values for the second plurality of block-level syntax elements are inferred to be the first value, infer the values for the second plurality of block-level syntax elements to be the first value without receiving, in the video data, instances of the second plurality of block-level syntax elements.

19. The non-transitory computer-readable medium of claim 17, wherein the first plurality of block-level syntax elements includes a plurality of syntax elements indicating whether the adaptive loop filter is enabled or disabled for blocks of a luma component of the first slice.

20. The non-transitory computer-readable medium of claim 17, wherein the first plurality of block-level syntax elements includes a plurality of syntax elements indicating whether the adaptive loop filter is enabled or disabled for blocks of a chroma component of the first slice.

21. The non-transitory computer-readable medium of claim 17, wherein the second plurality of block-level syntax elements includes a plurality of syntax elements indicating whether the adaptive loop filter is enabled or disabled for blocks of a luma component of the second slice.

22. The non-transitory computer-readable medium of claim 17, wherein the second plurality of block-level syntax elements includes a plurality of syntax elements indicating whether the adaptive loop filter is enabled or disabled for blocks of a chroma component of the second slice.

23. The non-transitory computer-readable medium of claim 17, wherein to receive the first plurality of block-level syntax elements, the one or more processors are further configured to:

decode a syntax element indicating whether the adaptive loop filter is enabled or disabled for a luma component of the first slice;

determine an entropy decoding context;

decode, based on the determined entropy decoding context, a syntax element indicating whether the adaptive loop filter is enabled or disabled for a first chroma component (cb) of the block of the second slice; and decode, based on the determined entropy decoding context, a syntax element indicating whether the adaptive loop filter is enabled or disabled for a second chroma component (cr) of the block of the second slice.

24. A device for encoding video data, the device comprising:

a memory configured to store video data; and one or more processors implemented in circuitry and configured to:

determine whether all blocks of a first slice of video data have an adaptive loop filter enabled for a component of the first slice;

in response to determining that all blocks of the first slice of video data have the adaptive loop filter enabled for the component of the first slice, set a first instance of a slice-level syntax data to a value indicating that values for a first plurality of block-level syntax elements for the first slice of video data are inferred;

determine whether all blocks of a second slice of video data have the adaptive loop filter enabled for the component of the second slice;

in response to determining that not all blocks of the second slice of video data have the adaptive loop filter enabled for the component of the second slice, set a second instance of the slice-level syntax data to a value indicating that values for a second plurality of block-level syntax elements for the second slice of video data are signaled in the video data;

determine, for each respective block of the component of the second slice, whether the adaptive loop filter is enabled or disabled for the respective block;

based on determining whether the adaptive loop filter is enabled or disabled for the respective block of the component of the second slice, set, for each respective block of the component of the second slice, a syntax element of the second plurality of syntax elements to either a first value indicating that the adaptive loop filter is enabled or a second value indicating that the adaptive loop filter is disabled; and output an encoded bitstream of video data comprising the first instance of the slice-level syntax data, the second instance of the slice-level syntax data, and the second plurality of block-level syntax elements.

25. The device of claim 24, wherein the first plurality of block-level syntax elements includes a plurality of syntax elements indicating whether the adaptive loop filter is enabled or disabled for blocks of a luma component of the first slice.

26. The device of claim 24, wherein the first plurality of block-level syntax elements includes a plurality of syntax elements indicating whether the adaptive loop filter is enabled or disabled for blocks of a chroma component of the first slice.

27. The device of claim 24, wherein the second plurality of block-level syntax elements includes a plurality of syntax elements indicating whether the adaptive loop filter is enabled or disabled for blocks of a luma component of the second slice.

28. The device of claim 24, wherein the second plurality of block-level syntax elements includes a plurality of syntax elements indicating whether the adaptive loop filter is enabled or disabled for blocks of a chroma component of the second slice.

29. The device of claim 24, wherein the device comprises a wireless communication device, further comprising a transmitter configured to transmit encoded video data.

30. The device of claim 29, wherein the wireless communication device comprises a telephone handset and wherein the transmitter is configured to modulate, according to a wireless communication standard, a signal comprising the encoded video data.

31. The method of claim 1, wherein:

setting each block-level syntax element of the second plurality of block-level syntax elements to the first value comprises setting each block-level syntax element of the second plurality of block-level syntax elements to the first value without receiving, in a bitstream of the video data, instances of the second plurality of block-level syntax elements; and receiving the first plurality of block-level syntax elements comprises receiving the first plurality of block-level syntax elements in the bitstream of the video data.

32. The device of claim 8, wherein:
to set each block-level syntax element of the second plurality of block-level syntax elements to the first value, the one or more processors are further configured to set each block- level syntax element of the second plurality of block-level syntax elements to the first value without receiving, in a bitstream of the video data, instances of the second plurality of block- level syntax elements; and
to receive the first plurality of block-level syntax elements, the one or more processors are further configured to receive the first plurality of block-level syntax elements in the bitstream of the video data.

* * * * *